United States Patent
Lee et al.

(10) Patent No.: US 10,868,954 B2
(45) Date of Patent: Dec. 15, 2020

(54) ELECTRONIC DEVICE FOR PROVIDING GRAPHIC INDICATOR FOR FOCUS AND METHOD OF OPERATING ELECTRONIC DEVICE

(71) Applicant: Samsung Electronics Co., Ltd., Suwon-si (KR)

(72) Inventors: Seung-Han Lee, Suwon-si (KR); Jong-Hyeok Chun, Hwaseong-si (KR); Pyo-Jae Kim, Suwon-si (KR); Young-Kwon Yoon, Seoul (KR); Moon-Soo Kim, Seoul (KR); Jong-Hun Won, Suwon-si (KR); Ki-Huk Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/928,737

(22) Filed: Mar. 22, 2018

(65) Prior Publication Data

US 2018/0278837 A1 Sep. 27, 2018

(30) Foreign Application Priority Data

Mar. 24, 2017 (KR) .................. 10-2017-0037826

(51) Int. Cl.
*H04N 5/235* (2006.01)
*H04N 5/232* (2006.01)

(52) U.S. Cl.
CPC ....... *H04N 5/23216* (2013.01); *H04N 5/2355* (2013.01); *H04N 5/23212* (2013.01);
(Continued)

(58) Field of Classification Search
None
See application file for complete search history.

(56) References Cited

U.S. PATENT DOCUMENTS 8,600,226 B2 12/2013 Hamada et al.
2004/0076315 A1* 4/2004 Scoll .................. G06K 9/0014
382/128
(Continued)

FOREIGN PATENT DOCUMENTS

CN 101753844 A 6/2010
CN 102625044 A 8/2012
(Continued)

OTHER PUBLICATIONS

Anonymous, "Depth map—Wikipedia, the free encyclopedia", Aug. 6, 2011, XP055209127, Retrieved from the Internet: URL: https://en.wikipedia.org/w/index.php?title=Depth_map&oldid=443358422, [retrieved on Aug. 24, 2015].
(Continued)

*Primary Examiner* — Mark T Monk
(74) *Attorney, Agent, or Firm* — Jefferson IP Law, LLP

(57) ABSTRACT

An electronic device is provided. The electronic device includes a camera, a display, a memory, and at least one processor. The at least one processor may be configured to generate, based on information on pixels included in an image including at least one subject obtained using the camera, depth information corresponding to the at least one subject, to determine, based on the depth information, a first area displaying a first graphic indicator for indicating a focusing area on which the camera is focused, in the image displayed on the display, in a case in which a focus of the camera is controlled, and to display the first graphic indicator on at least some of the at least one subject included in the first area.

20 Claims, 28 Drawing Sheets

(52) U.S. Cl.
CPC ..... *H04N 5/23293* (2013.01); *H04N 5/23296* (2013.01); *H04N 5/232127* (2018.08); *H04N 5/232939* (2018.08); *H04N 5/232945* (2018.08)

(56) References Cited

U.S. PATENT DOCUMENTS

| | | |
|---|---|---|
| 2010/0157127 A1 | 6/2010 | Takayanagi et al. |
| 2012/0185889 A1* | 7/2012 | Folgner ............... H04H 60/33 725/13 |
| 2012/0194709 A1 | 8/2012 | Yokohata |
| 2015/0010236 A1 | 1/2015 | Chang et al. |
| 2015/0189154 A1* | 7/2015 | Laroia ............... H04N 5/23212 348/345 |
| 2015/0242982 A1 | 8/2015 | Choi et al. |
| 2016/0127636 A1 | 5/2016 | Ito et al. |

FOREIGN PATENT DOCUMENTS

| | | |
|---|---|---|
| CN | 105210018 A | 12/2015 |
| EP | 2 597 863 A2 | 5/2013 |
| JP | 2005-278053 A | 10/2005 |
| WO | 2013/156042 A1 | 10/2013 |

OTHER PUBLICATIONS

European Summons to attend oral proceedings dated Mar. 18, 2020, issued in European Patent Application No. 18163448.6-1208.

Chinese Office Action dated Oct. 9, 2020, issued in Chinese Patent Application No. 201810249601.4.

European Office Action dated Oct. 23, 2020, issued in European Patent Application No. 18163448.6-1208.

* cited by examiner

ELECTRONIC DEVICE FOR PROVIDING GRAPHIC INDICATOR FOR FOCUS AND METHOD OF OPERATING ELECTRONIC DEVICE

CROSS-REFERENCE TO RELATED APPLICATION(S)

This application is based on and claims priority under 35 U.S.C. § 119(a) of a Korean patent application number 10-2017-0037826, filed on Mar. 24, 2017, in the Korean Intellectual Property Office, the disclosure of which is incorporated by reference herein in its entirety.

TECHNICAL FIELD

The disclosure relates to an electronic device. More particularly, the disclosure relates to an electronic device for providing a graphic indicator for a focus and a method of operating the electronic device.

BACKGROUND

In a manual focus operation, in which a focus of a camera is manually controlled, an electronic device including the camera provides a graphic indicator, such as focus peaking of an object included in a focused area, so as to easily control the focus manually by identifying the focused area.

The electronic device including a camera has provided a graphic indicator to an object included in a focused area using contrast information of an image for focus peaking, according to the related art. However, the method of using the contrast information may display a graphic indicator for an object of which the position is not accurate according to edge information of a subject to be imaged, the contrast information, and/or luminance and brightness, whereby accuracy and usability may be reduced.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device and a method for operating the electronic device which provides a graphic indicator to a subject included in a focused area using depth information of an image so as to identify the focused area, when a focus of a camera is manually operated.

In accordance with an aspect of the disclosure, an electronic device is provided. The electronic device includes a camera, a display, a memory, and at least one processor. The at least one processor may be configured to generate, based on information on pixels included in an image including at least one subject obtained using the camera, depth information corresponding to at least one subject, to determine, based on the depth information, a first area displaying a first graphic indicator for indicating a focusing area on which the camera is focused, in the image displayed on the display, in a case in which a focus of the camera is controlled, and to display the first graphic indicator on at least some of the subject included in the first area.

In accordance with another aspect of the disclosure, a method of operating an electronic device is provided. The method of operating an electronic device includes generating, based on information on pixels included in an image including at least one subject obtained using a camera included in the electronic device, depth information corresponding to at least one subject, determining, based on the depth information, a first area displaying a first graphic indicator for indicating a focusing area on which the camera is focused, in the image displayed on a display, in a case in which a focus of the camera is controlled, and displaying the first graphic indicator on at least some of the subject included in the first area.

In accordance with another aspect of the disclosure, an electronic device is provided. The electronic device includes a camera, a display, a memory, and at least one processor. The at least one processor may be configured to generate, based on information on pixels included in an image including at least one subject obtained using the camera, depth information corresponding to at least one subject, to determine a focusing area on which the camera is focused according to an input signal, in the image displayed on the display, and to display, based on the depth information, the first graphic indicator on at least some of the subject included in the focusing area.

According to various embodiments of the disclosure, an electronic device displays a graphic indicator on a subject included in a focused area using depth information of an image when a manual focus of a camera is operated. Thus, the electronic device can accurately and efficiently identify the focused area.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
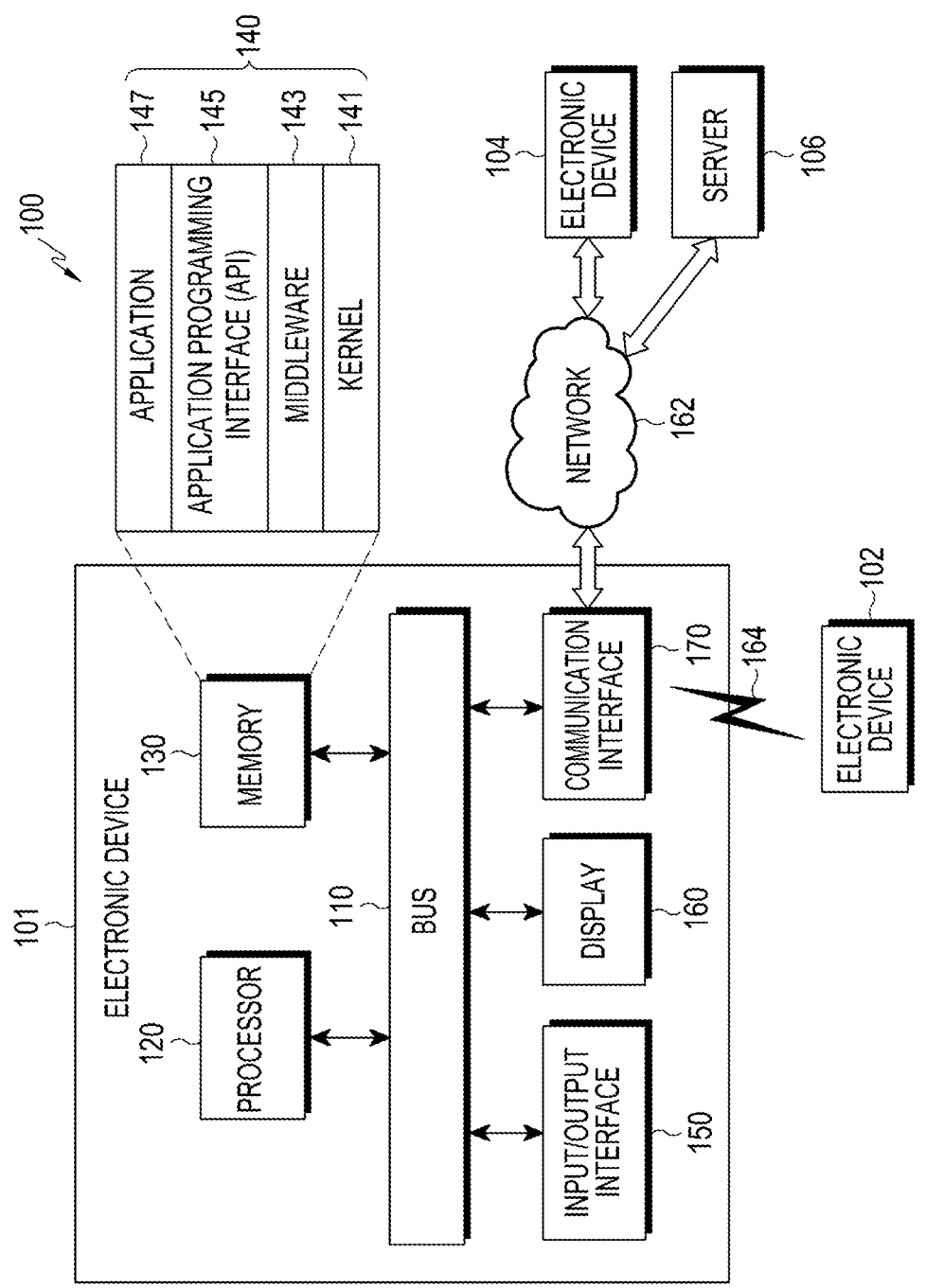
FIG. 1 is a block diagram illustrating an electronic device and a network according to various embodiments of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The expression "configured to" as used in various embodiments may be interchangeably used with, for example, "suitable for", "having the capacity to", "designed to", "adapted to", "made to", or "capable of" in terms of hardware or software, according to circumstances. Alternatively, in some situations, the expression "device configured to" may mean that the device, together with other devices or components, "is able to". For example, the phrase "processor adapted (or configured) to perform A, B, and C" may mean a dedicated processor (e.g., an embedded processor) only for performing the corresponding operations or a generic-purpose processor (e.g., a central processing unit (CPU) or an application processor (AP)) that can perform the corresponding operations by executing one or more software programs stored in a memory device.

An electronic device according to various embodiments may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a moving picture experts group (MPEG-1 or MPEG-2) audio layer-3 (MP3) player, a mobile medical device, a camera, a wearable device, or the like. According to various embodiments of the disclosure, the wearable device may include at least one of an accessory type (e.g., a watch, a ring, a bracelet, an anklet, a necklace, glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit). In an embodiment of the disclosure, the electronic device may include at least one of, for example, a television, a digital video disc (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

In other embodiments of the disclosure, the electronic device may include at least one of various medical devices (e.g., various portable medical measuring devices (a blood glucose monitoring device, a heart rate monitoring device, a blood pressure measuring device, a body temperature measuring device, and the like), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, and the like). According to some embodiments of the disclosure, the electronic device may include at least one of a part of furniture or a building/structure, an electronic board, an electronic signature receiving device, a projector, and various kinds of measuring instruments (e.g., a water meter, an electric meter, a gas meter, and a radio wave meter). In various embodiments of the disclosure, the electronic device may be flexible, or may be a combination of one or more of the aforementioned various devices. The electronic device according to one embodiment is not limited to the above described devices. In an embodiment of the disclosure, the term "user" may indicate a person using an electronic device or a device (e.g., an artificial intelligence electronic device) using an electronic device.

FIG. 1 is a block diagram illustrating an electronic device and a network according to various embodiments of the disclosure.

Referring to FIG. 1, an electronic device 101 in a network environment 100 according to various embodiments will be described with reference to FIG. 1. The electronic device 101 may include a bus 110, a processor 120, a memory 130, an input/output interface 150, a display 160, and a communication interface 170. In some embodiments of the disclosure, the electronic device 101 may omit at least one of the above elements, or may further include other elements. The bus 110 may include, for example, a circuit that interconnects the elements 110 to 170 and transmits communication (for example, control messages or data) between the elements. The processor 120 may include one or more of a CPU, an AP, and a communication processor (CP). The processor 120, for example, may carry out operations or data processing relating to the control and/or communication of at least one other element of the electronic device 101.

The memory 130 may include a volatile and/or non-volatile memory. The memory 130 may store, for example, instructions or data relevant to at least one other elements of the electronic device 101. According to an embodiment of the disclosure, the memory 130 may store software and/or a program 140. The program 140 may include a kernel 141, middleware 143, an application programming interface (API) 145, and/or application programs (or "applications") 147. At least some of the kernel 141, the middleware 143, and the API 145 may be referred to as an operating system (OS). The kernel 141 may control or manage system resources (for example, the bus 110, the processor 120, or the memory 130) used for executing an operation or function implemented by other programs (for example, the middleware 143, the API 145, or the application 147) or the application program 147. Furthermore, the kernel 141 may provide an interface by which the middleware 143, the API 145, or the application programs 147 may access the individual elements of the electronic device 101 to control or manage the system resources.

The middleware 143 may function as, for example, an intermediary for allowing the API 145 or the application programs 147 to communicate with the kernel 141 to exchange data. Furthermore, the middleware 143 may process one or more task requests, which are received from the application programs 147, according to priorities thereof. For example, the middleware 143 may assign priorities for using the system resources (for example, the bus 110, the processor 120, the memory 130, or the like) of the electronic device 101 to one or more of the application programs 147, and may process the one or more task requests. The API 145 is an interface by which the applications 147 control functions provided from the kernel 141 or the middleware 143, and may include, for example, at least one interface or function (for example, instruction) for file control, window control, image processing, or text control. For example, the input/output interface 150 may forward instructions or data, input from a user or an external device, to the other element(s) of the electronic device 101, or may output instructions or data, received from the other element(s) of the electronic device 101, to the user or the external device.

The display 160 may include, for example, a liquid crystal display (LCD), a light-emitting diode (LED) display, an organic light-emitting diode (OLED) display, a micro electro mechanical system (MEMS) display, or an electronic paper display. The display 160 may display, for example, various types of content (e.g., text, images, videos, icons, and/or symbols) for a user. The display 160 may include a touch screen and may receive, for example, a touch, gesture, proximity, or hovering input using an electronic pen or the user's body part. The communication interface 170, for example, may set communication between the electronic device 101 and an external device (e.g., a first external electronic device 102, a second external electronic device 104, or a server 106). For example, the communication interface 170 may be connected to a network 162 via wireless or wired communication to communicate with the external device (for example, the second external electronic device 104 or the server 106), as exemplified by an element 164.

The wireless communication may include, for example, cellular communication that uses at least one of long term evolution (LTE), LTE-advanced (LTE-A), code division multiple access (CDMA), wideband CDMA (WCDMA), universal mobile telecommunications system (UMTS), wireless broadband (WiBro), global system for mobile communications (GSM), or the like. According to an embodiment of the disclosure, for example, the wireless communication may include at least one of wireless fidelity (WiFi), light fidelity (LiFi), Bluetooth, Bluetooth low energy (BLE), Zigbee, near field communication (NFC), magnetic secure transmission, radio frequency (RF), and body area network (BAN), as exemplified by the element 164 of FIG. 1. According to an embodiment of the disclosure, the wireless communication may include global navigation satellite system (GNSS). The GNSS may be, for example, a GPS, a global navigation satellite system (Glonass), a Beidou navigation satellite system (hereinafter, referred to as "Beidou"), Galileo, or the European global satellite-based navigation system. Hereinafter, in this document, the term "GPS" may be interchangeable with the term "GNSS". The wired communication may include, for example, at least one of a universal serial bus (USB), a high definition multimedia interface (HDMI), recommended standard 232 (RS-232), power line communication, a plain old telephone service (POTS), and the like. The network 162 may include a telecommunications network, for example, at least one of a computer network (for example, a local access network (LAN) or a wide access network (WAN)), the Internet, and a telephone network.

Each of the first external electronic device 102 and the second external electronic device 104 may be of a type identical to or different from that of the electronic device 101. According to various embodiments of the disclosure, all or some of the operations executed by the electronic device 101 may be executed by another electronic device, a plurality of electronic devices (for example, the first external electronic device 102 and the second external electronic device 104), or the server 106. According to an embodiment of the disclosure, when the electronic device 101 has to perform a function or service automatically or in response to a request, the electronic device 101 may request another device (for example, the first external electronic device 102 or the second external electronic device 104, or the server 106) to perform at least some functions relating thereto, instead of autonomously or additionally performing the function or service. Another electronic device (for example, the first external electronic device 102 or the second external electronic device 104, or the server 106) may execute the requested functions or the additional functions, and may deliver the result of execution thereof to the electronic device 101. The electronic device 101 may provide the received result as it is, or may additionally process the received result to provide the requested functions or services. To this end, for example, cloud computing, distributed computing, or client-server computing technology may be used.

Figure 2:
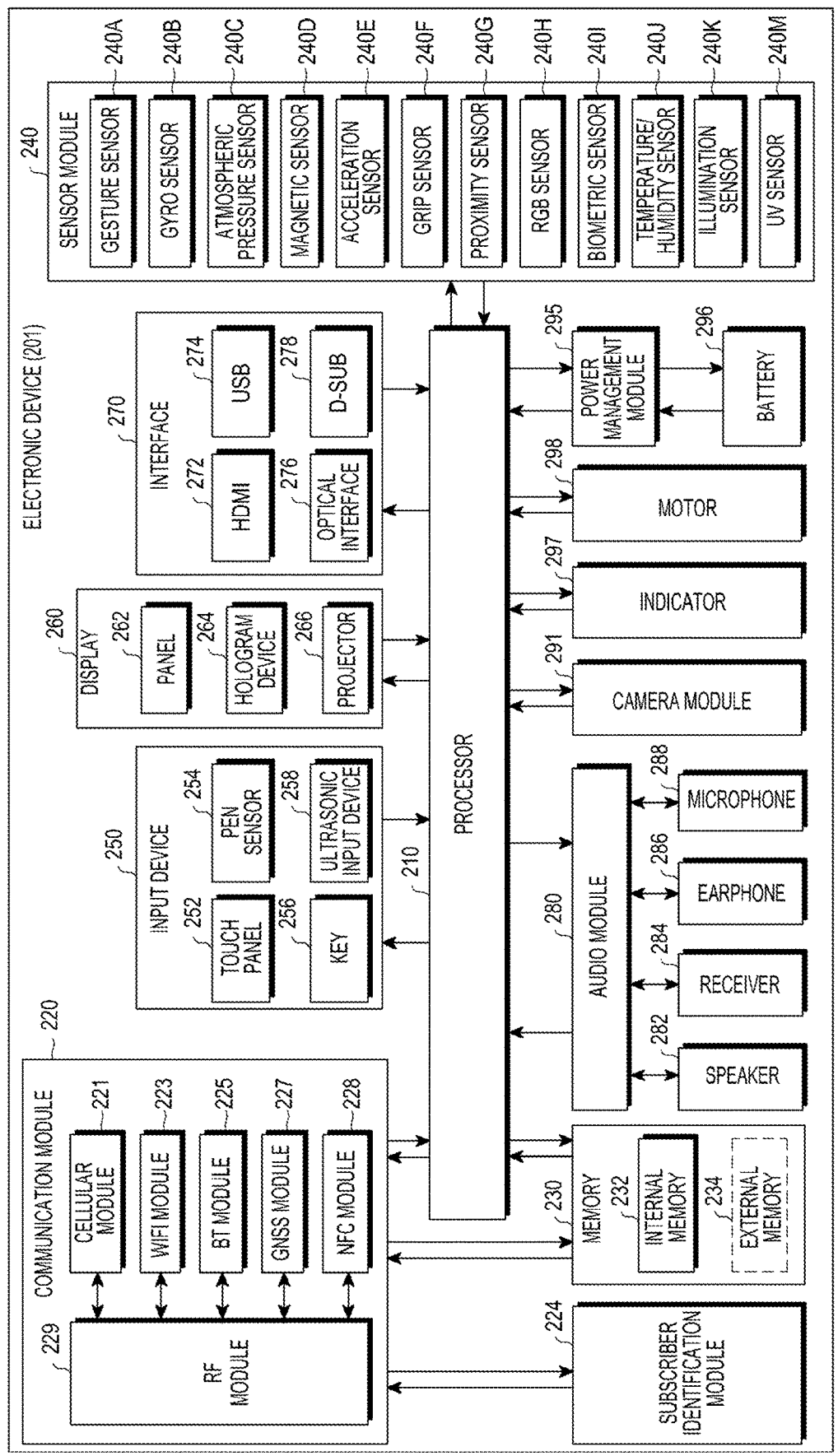
FIG. 2 is a block diagram of an electronic device according to various embodiments of the disclosure.

FIG. 2 is a block diagram illustrating an electronic device according to various embodiments of the disclosure.

Referring to FIG. 2, an electronic device 201 may include, for example, all or part of the electronic device 101 illustrated in FIG. 1. The electronic device 201 may include at least one processor 210 (for example, an AP), a communication module 220, a subscriber identification module 224, a memory 230, a sensor module 240, an input device 250, a display 260, an interface 270, an audio module 280, a camera module 291, a power management module 295, a battery 296, an indicator 297, and a motor 298. The processor 210 may control a plurality of hardware or software elements connected to the processor 210 by running, for example, an OS or an application program, and may perform processing and arithmetic operations of various types of data. The processor 210 may be implemented by, for example, a system on chip (SoC). According to an embodiment of the disclosure, the processor 210 may further include a graphics processing unit (GPU) and/or an image signal processor (ISP). The processor 210 may also include at least some of the elements illustrated in FIG. 2 (for example, a cellular module 221). The processor 210 may load, in volatile memory, instructions or data received from at least one of the other elements (for example, a non-volatile memory), process the loaded instructions or data, and store the result data in the non-volatile memory.

The communication module 220 may have a configuration identical or similar to that of the communication interface 170 illustrated in FIG. 1. For example, the communication module 220 may include a cellular module 221, a Wi-Fi module 223, a Bluetooth module 225, a GNSS module 227, an NFC module 228, and a RF module 229. For example, the cellular module 221 may provide a voice call, a video call, a short message service, or an Internet service over a communication network. According to an embodiment of the disclosure, the cellular module 221 may identify or authenticate an electronic device 201 in the communication network using a subscriber identification module (for example, a subscriber identity module (SIM) card) 224. According to an embodiment of the disclosure, the cellular module 221 may perform at least some of the functions that the AP 210 may provide. According to an embodiment of the disclosure, the cellular module 221 may include a CP. In some embodiments of the disclosure, at least some (i.e., two or more) of the cellular module 221, the Wi-Fi module 223, the Bluetooth module 225, the GNSS module 227, and the NFC module 228 may be included in a single integrated chip (IC) or IC package. The RF module 229 may transmit/receive, for example, a communication signal (for example, an RF signal). The RF module 229 may include, for example, a transceiver, a power amp module (PAM), a frequency filter, a low noise amplifier (LNA), an antenna, or the like. According to another embodiment of the disclosure, at least one of the cellular module 221, the Wi-Fi module 223, the BT module 225, the GNSS module 227, and the NFC module 228 may transmit/receive an RF signal via a separate RF module. The subscriber identification module 224 may include, for example, a card that includes a SIM and/or an embedded SIM, and may contain unique identification information (for example, an integrated circuit card identifier (ICCID)) or subscriber information (for example, an international mobile subscriber identity (IMSI)).

The memory 230 (for example, the memory 130) may include, for example, an internal memory 232 or an external memory 234. The internal memory 232 may include, for example, at least one of a volatile memory (for example, a dynamic random access memory (DRAM), a static RAM (SRAM), a synchronous dynamic (SDRAM), or the like) and a non-volatile memory (for example, a one time programmable read only memory (OTPROM), a programmable ROM (PROM), an erasable programmable ROM (EPROM), an electrically erasable programmable ROM (EEPROM), a mask ROM, a flash ROM, a flash memory, a hard disc drive, or a solid state drive (SSD)). The external memory 234 may include a flash drive, for example, a compact flash (CF), a secure digital (SD), a micro-SD, a mini-SD, an eXtreme digital (xD), a multi-media card (MMC), a memory stick, and the like. The external memory 234 may be functionally or physically connected to the electronic device 201 via various interfaces.

The sensor module 240 may, for example, measure a physical quantity or detect the operating state of the electronic device 201, and may convert the measured or detected information into an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (for example, a red, green, blue (RGB) sensor), a biometric sensor 240I, a temperature/humidity sensor 240J, an illumination sensor 240K, and an ultraviolet (UV) sensor 240M. Additionally or alternatively, the sensor module 240 may include, for example, an e-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling one or more sensors included therein. In some embodiments of the disclosure, the electronic device 201 may further include a processor, which is configured to control the sensor module 240, as a part of the processor 210 or separately from the processor 210 in order to control the sensor module 240 while the processor 210 is in a sleep state.

The input device 250 may include, for example, a touch panel 252, a (digital) pen sensor 254, a key 256, or an ultrasonic input device 258. The touch panel 252 may use, for example, at least one of a capacitive type, a resistive type, an IR type, and an ultrasonic type. Furthermore, the touch panel 252 may further include a control circuit. The touch panel 252 may further include a tactile layer to provide a tactile reaction to a user. The (digital) pen sensor 254 may include, for example, a recognition sheet that is a part of, or separate from, the touch panel. The key 256 may include, for example, a physical button, an optical key, or a keypad. The ultrasonic input device 258 may detect ultrasonic waves, which are generated by an input tool, via a microphone (for example, a microphone 288) to identify data corresponding to the detected ultrasonic waves.

The display 260 (for example, the display 160) may include a panel 262, a hologram device 264, a projector 266, and/or a control circuit for controlling them. The panel 262 may be implemented to be, for example, flexible, transparent, or wearable. The panel 262, together with the touch panel 252, may be configured as one or more modules. According to an embodiment of the disclosure, the panel 262 may include a pressure sensor (or a POS sensor) which may measure the strength of pressure of a user's touch. The pressure sensor may be implemented so as to be integrated with the touch panel 252, or may be implemented as one or more sensors separate from the touch panel 252. The hologram device 264 may show a three-dimensional image in the air by using light interference. The projector 266 may display an image by projecting light onto a screen. The screen may be positioned, for example, in the interior of, or on the exterior of, the electronic device 201. The interface 270 may include, for example, an HDMI 272, a USB 274, an optical interface 276, or a D-subminiature (D-sub) interface 278. The interface 270 may be included in, for example, the communication interface 170 illustrated in FIG. 1. Additionally or alternatively, the interface 270 may, for example, include a mobile high-definition link (MHL) interface, a SD card/MMC interface, or an infrared data association (IrDA) standard interface.

The audio module 280 may bi-directionally convert, for example, a sound and an electric signal. At least some elements of the audio module 280 may be included, for example, in the input/output interface 150 illustrated in FIG. 1. The audio module 280 may process sound information that is input or output via, for example, a speaker 282, a receiver 284, earphones 286, the microphone 288, and the like. The camera module 291 is a device that can photograph a still image and a moving image. According to an embodiment of the disclosure, the camera module 291 may include one or more image sensors (for example, a front sensor or a rear sensor), a lens, an ISP, or a flash (for example, an LED or xenon lamp). The power management module 295 may manage, for example, the power of the electronic device 201. According to an embodiment of the disclosure, the power management module 295 may include a power management integrated circuit (PMIC), a charger IC, or a battery or fuel gauge. The PMIC may use a wired and/or wireless charging method. Examples of the wireless charging method may include a magnetic resonance method, a magnetic induction method, an electromagnetic wave method, and the like. Additional circuits (for example, a coil loop, a resonance circuit, a rectifier, and the like) for wireless charging may be further included. The battery gauge may measure, for example, the remaining charge of the battery 296 and a voltage, current, or temperature while charging. The battery 296 may include, for example, a rechargeable battery and/or a solar battery.

The indicator 297 may display a particular state, for example, a booting state, a message state, a charging state, or the like of the electronic device 201 or a part (for example, the processor 210) of the electronic device 201. The motor 298 may convert an electrical signal into a mechanical vibration, and may generate a vibration or haptic effect. The electronic device 201 may include a mobile TV support device (e.g., CPU) that can process media data according to a standard, such as digital multimedia broadcasting (DMB), digital video broadcasting (DVB), mediaFlo™, or the like. Each of the above-described component elements of hardware according to an embodiment of the disclosure may be configured with one or more components, and the names of the corresponding component elements may vary based on the type of electronic device. According to various embodiments of the disclosure, the electronic device (e.g., the electronic device 201) may not include some elements, or may further include additional elements. Some elements may be coupled to constitute one object, but the electronic device may perform the same functions as those which the corresponding elements have before being coupled to each other.

Figure 3:
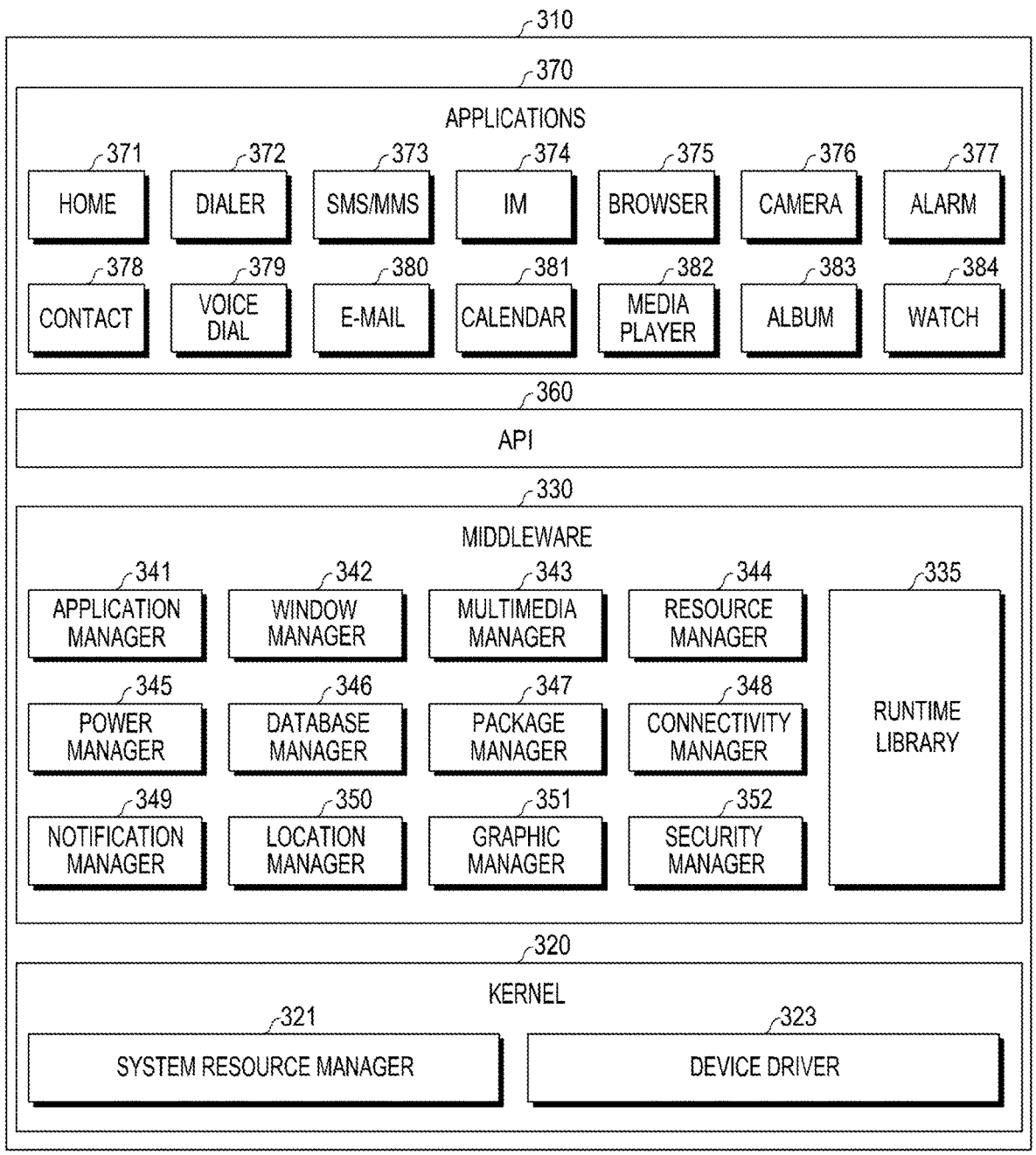
FIG. 3 is a block diagram of a program module according to various embodiments of the disclosure.

FIG. 3 is a block diagram of a program module according to various embodiments of the disclosure.

Referring to FIG. 3, according to an embodiment of the disclosure, a program module 310 (for example, the program 140) may include an OS for controlling resources related to the electronic device (for example, the electronic device 101) and/or various applications (for example, the application programs 147) executed in the OS. The OS may include, for example, Android™, iOS™, Windows™, Symbian™, Tizen™, or Bada™. Referring to FIG. 3, the program module 310 may include a kernel 320 (for example, the kernel 141), middleware 330 (for example, the middleware 143), an API 360 (for example, the API 145), and/or applications 370 (for example, the application programs 147). At least some of the program module 310 may be preloaded on the electronic device, or may be downloaded from an external electronic device (for example, the first external electronic device 102 or the second external electronic device 104, or the server 106).

The kernel 320 may include, for example, a system resource manager 321 and/or a device driver 323. The system resource manager 321 may control, allocate, or retrieve system resources. According to an embodiment of the disclosure, the system resource manager 321 may include a process manager, a memory manager, a file system manager, or the like. The device driver 323 may include, for example, a display driver, a camera driver, a Bluetooth driver, a shared memory driver, a USB driver, a keypad driver, a WiFi driver, an audio driver, or an inter-process communication (IPC) driver. The middleware 330 may provide, for example, a function required by the applications 370 in common, or may provide various functions to the applications 370 through the API 360 such that the applications 370 can efficiently use the limited system resources within the electronic device. According to an embodiment of the disclosure, the middleware 330 may include at least one of a runtime library 335, an application manager 341, a window manager 342, a multi-media manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a compiler uses in order to add a new function through a programming language while the applications 370 are being executed. The runtime library 335 may manage an input/output, manage a memory, or process an arithmetic function. The application manager 341 may manage, for example, the life cycles of the applications 370. The window manager 342 may manage graphical user interface (GUI) resources used for a screen. The multimedia manager 343 may identify formats required for reproducing various media files and may encode or decode a media file using a codec suitable for the corresponding format. The resource manager 344 may manage the source code of the applications 370 or the space in memory. The power manager 345 may manage, for example, the capacity or power of a battery, and may provide power information required for operating the electronic device. According to an embodiment of the disclosure, the power manager 345 may operate in conjunction with a basic input/output system (BIOS). The database manager 346 may, for example, generate, search, or change databases to be used by the applications 370. The package manager 347 may manage the installation or update of an application that is distributed in the form of a package file.

The connectivity manager 348 may manage, for example, a wireless connection. The notification manager 349 may provide an event, such as a received message, an appointment, and a proximity notification to a user. The location manager 350 may manage, for example, the location information of the electronic device. The graphic manager 351 may manage a graphic effect to be provided to a user and a user interface relating to the graphic effect. The security manager 352 may provide, for example, system security or user authentication. According to an embodiment of the disclosure, the middleware 330 may include a telephony manager for managing a voice or video call function of the electronic device or a middleware module that is capable of forming a combination of the functions of the above-described elements. According to an embodiment of the disclosure, the middleware 330 may provide a module specified for each type of the OS. The middleware 330 may dynamically remove some of the existing elements, or may add new elements. The API 360 is, for example, a set of API programming functions, and may be provided with different configurations according to OSs. For example, in the case of Android or iOS, one API set may be provided for each platform, and in the case of Tizen, two or more API sets may be provided for each platform.

The applications 370 may include an application providing, for example, a home application 371, a dialer application 372, a short message service (SMS)/multimedia message service (MMS) application 373, an instant message (IM) application 374, a browser application 375, a camera application 376, an alarm application 377, contacts application 378, a voice dial application 379, an email application 380, a calendar application 381, a media player application 382, an album application 383, a watch application 384, health care (for example, measure exercise quantity or blood sugar), or environment information (for example, atmospheric pressure, humidity, or temperature information). According to an embodiment of the disclosure, the applications 370 may include an information exchange application that can support the exchange of information between the electronic device and an external electronic device. The information exchange application may include, for example, a notification relay application for relaying particular information to an external electronic device or a device management application for managing an external electronic device. For example, the notification relay application may relay notification information generated in the other applications of the electronic device to an external electronic device, or may receive notification information from an external electronic device and provide the received notification information to a user. The device management application may, for example, install, delete, or update a function of the external electronic device communicating with the electronic device (for example, a function of turning on/off the external electronic device itself (or some components thereof) or a function of adjusting luminance (or a resolution) of the display or applications operating in the external electronic device. According to an embodiment of the disclosure, the applications 370 may include applications (for example, a health care application of a mobile medical appliance) that are designated according to the attributes of an external electronic device. According to an embodiment of the disclosure, the applications 370 may include applications received from an external electronic device. At least some of the program module 310 may be implemented (for example, executed) by software, firmware, hardware (for example, the processor 210), or a combination of two or more thereof, and may include a module, a program, a routine, an instruction set, or a process for performing one or more functions.

The term "module" as used herein may include a unit consisting of hardware, software, or firmware, and may, for example, be used interchangeably with the term "logic", "logical block", "component", "circuit", or the like. The "module" may be an integrated component, or a minimum unit for performing one or more functions or a part thereof. The "module" may be mechanically or electronically implemented and may include, for example, an application-specific integrated circuit (ASIC) chip, a field-programmable gate arrays (FPGA), or a programmable-logic device, which has been known or are to be developed in the future, for performing certain operations.

At least some of devices (e.g., modules or functions thereof) or methods (e.g., operations) according to various embodiments may be implemented by an instruction which is stored a computer-readable storage medium (e.g., the memory 130) in the form of a program module. The instruction, when executed by a processor (e.g., the processor 120), may cause the one or more processors to execute the function corresponding to the instruction. The computer-readable storage medium may include a hard disk, a floppy disk, a magnetic medium (e.g., a magnetic tape), an optical media (e.g., CD-ROM, DVD), a magneto-optical media (e.g., a floptical disk), an inner memory, and the like. The instruction may include a code made by a complier or a code that can be executed by an interpreter. The programming module according to an embodiment of the disclosure may include one or more of the aforementioned elements or may further include other additional elements, or some of the aforementioned elements may be omitted. Operations performed by a module, a programming module, or other elements according to various embodiments may be executed sequentially, in parallel, repeatedly, or in a heuristic manner. At least some operations may be executed according to another sequence, may be omitted, or may further include other operations.

Figure 4:
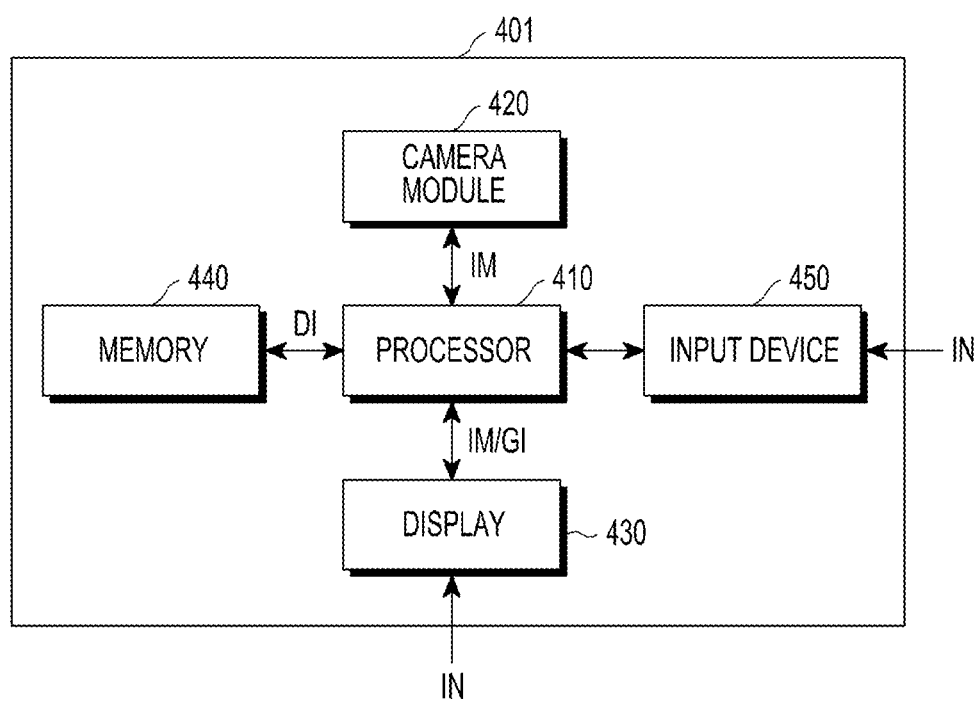
FIG. 4 is a block diagram schematically illustrating an electronic device according to various embodiments of the disclosure.

FIG. 4 is a block diagram schematically illustrating an electronic device according to various embodiments of the disclosure.

Referring to FIG. 4, an electronic device 401 may include a configuration substantially similar to or identical to that of the electronic device 101 or 201 of FIG. 1 or FIG. 2.

The electronic device 401 may include a processor 410 (e.g., the processor 120 or 210 of FIG. 1 or FIG. 2), a camera module 420 (e.g., the camera module 291 of FIG. 2), a display 430 (e.g., the display 160 or 260 of FIG. 1 or FIG. 2), a memory 440 (e.g., the memory 130 or 230 of FIG. 1 or FIG. 2), and an input device 450 (e.g., the input device 250 of FIG. 2).

The processor 410 may control the overall operation of the electronic device 401.

According to an embodiment of the disclosure, the processor 410 may obtain an image IM using the camera module 420. For example, the image IM may include a still image and/or a video. For example, the image IM may include at least one subject. In addition, the image IM may include a plurality of pixels.

According to an embodiment of the disclosure, the processor 410 may generate, based on information on the plurality of pixels included in the image IM obtained using the camera module 420, depth information DI corresponding to at least one subject included in the image IM. The processor 410 may generate the depth information DI using a distance measuring sensor (not shown). For example, the distance measuring sensor may include a time of fight (TOF) camera.

The depth information DI may refer to distance information of at least one subject included in the image IM. For example, the depth information DI may include a depth map for at least one subject included in the image IM.

The processor 410 may generate contrast information for the image IM.

The processor 410 may display the image IM on the display 430. For example, the processor 410 may display the image IM as a preview image for imaging on the display 430.

The processor 410 may control a focus of the camera module 420 according to an input signal IN by a user, in the image IM displayed on the display 430. For example, in a manual focus operation, the processor 410 may move the position of a lens included in the camera module 420 according to the input signal IN by the user, and may control the focus of the lens.

The processor 410 may determine a focusing area on which the camera module 420 is focused according to the input signal IN by the user, in the image IM displayed on the display 430.

For example, the focusing area may refer to an area on which the camera module 420 is focused in the image IM displayed on the display 430. For example, the focusing area may refer to an in-focus area in the image IM. Meanwhile, an area different from the focusing area may refer to an area on which the camera module 420 is not focused. For example, the area different from the focusing area may be referred to as an out-focus area.

For example, the input signal IN may refer to a signal corresponding to an input for controlling the focus by the user, in the manual focus operation. In addition, the input signal IN may also refer to a signal corresponding to an input for controlling the depth.

According to an embodiment of the disclosure, in a case in which the focus of the camera included in the camera module 420 is controlled according to the input signal IN, the processor 410 may determine, based on the depth information DI, a first area in which a graphic indicator GI is displayed, in the image IM displayed on the display 430. For example, the first area may refer to an area in which a graphic indicator for indicating the focusing area of the camera in the image IM is displayed.

According to an embodiment of the disclosure, the processor 410 may also determine, based on the depth information DI and the contrast information of the image IM, the first area in which the graphic indicator GI is displayed.

The graphic indicator GI may refer to an indicator for indicating the focusing area of the camera. The graphic indicator GI may also refer to an indicator (or marker) displayed on the subject focused on the image IM by highlighting at least some of the subject using a line and/or point of a specific color. For example, the graphic indicator GI may refer to an indicator (or marker) displayed on the subject included in the focusing area, in a focuspeaking function.

According to an embodiment of the disclosure, the processor 410 may display, based on the depth information DI, the graphic indicator GI on at least some (or in the vicinity (e.g., edge, face, and/or outside of the edge) of the subject) of the subject included in the focusing area of the image IM, in the image IM displayed on the display 430. The processor 410 may also display, based on the depth information DI and the contrast information of the image IM, the graphic indicator GI on at least some (or in the vicinity (e.g., edge, face, and/or outside of the edge) of the subject) of the subject included in the focusing area, in the image IM displayed on the display 430.

For example, the processor 410 may obtain, based on the depth information DI, distance information of at least one subject included in the image IM. In addition, the processor 410 may identify, based on the depth information DI, at least one subject included in the image IM.

The processor 410 may detect, based on the contrast information, a portion (in general, an edge portion of the subject) of which the contrast value is higher than a predetermined value, in the subject included in the image IM. The processor 410 may identify, based on the detected portion, at least one subject included in the image IM.

The processor 410 may determine, based on the depth information DI and the contrast information of the image IM, the first area in which the graphic indicator GI for indicating the focusing area is displayed. For example, the processor 410 may determine, based on the distance information on at least one subject included in the image IM which is obtained via the depth information DI, and the portion of which the contrast is high in the image IM which is obtained via the contrast information, the first area in which the graphic indicator GI is displayed.

The processor 410 may display the graphic indicator GI on at least some of the subject included in the determined first area.

According to an embodiment of the disclosure, the processor 410 may recognize, based on the input signal IN by the user and the depth information DI, the focusing area (e.g., the position of the focus area) of the image IM.

The processor 410 may display, based on the depth information DI, the graphic indicator GI on at least some of the subject included in the focusing area of the image IM, in the image IM displayed on the display 430. For example, the processor 410 may obtain, based on the depth information DI, the distance information on at least one subject included in the image IM. In addition, the processor 410 may identify, based on information on the recognized focusing area and the depth information DI, at least one subject included in the image IM. The processor 410 may display the graphic indicator GI on at least some of the identified subject (e.g., the subject included in the focusing area), in the image IM displayed on the display 430.

According to an embodiment of the disclosure, the processor 410 may display a first graphic indicator using a first attribute (e.g., a first color) on at least some of the subject included in the first area corresponding to the focusing area of the image IM. In addition, the processor 410 may display a graphic indicator using an attribute different from the first attribute on at least some of the other area different from the first area of the image IM.

The processor 410 may determine, based on the depth information DI, the second area, which is farther away from the electronic device 401 (e.g., the camera module 420 of the electronic device 401) than the first area, and a third area, which is closer to the electronic device 401 than the first area, among the other area different from the first area corresponding to the focusing area. The processor 410 may display a second graphic indicator using a second attribute (e.g., a second color) on at least some of the subject included in the second area, and may display a third graphic indicator using a third attribute (e.g., a third color) on at least some of the subject included in the third area.

For example, the first attribute, the second attribute, and the third attribute may refer to attributes that are different from one another. For example, the first attribute, the second attribute, and the third attribute may refer to means for highlighting the subject included in the first area, corresponding to the focusing area in the image IM, such as a specific color, shape, size, and/or brightness.

The processor 410 may display a graphic interface for setting a focusing area on the display 430 in response to the input signal IN. For example, the processor 410 may display an object corresponding to the focusing area on the graphic interface. In the graphic interface, the processor 410 may display a first portion corresponding to the focusing area using the first attribute, display a second portion corresponding to the second area using the second attribute, and display a third portion corresponding to the third area using the third attribute.

The processor 410 may determine the depth corresponding to the focusing area. The processor 410 may also display an object of an attribute (e.g., size and/or shape) corresponding to the determined depth on the graphic interface.

The processor 410 may control, based on the depth information DI, a reference value for the display of the graphic indicator GI. For example, the reference value may refer to a threshold value of the contrast for displaying the graphic indicator GI. For example, since the threshold value is high in a case in which the reference value is high, the processor 410 may display the graphic indicator GI only in a case in which the high contrast is detected. In addition, since the threshold of the contrast is low in a case in which the reference value is low, the processor 410 may display the graphic indicator GI even though the low contrast is detected.

According to an embodiment of the disclosure, the processor 410 may determine whether a zoom function of the image IM is executed. The processor 410 may control, based on the zoom ratio of the image IM and the depth information DI, the reference value for the display of the graphic indicator GI. For example, in a case in which the zoom ratio of the image IM displayed on the display 430 increases, the processor 410 may reduce the reference value for the display of the graphic indicator GI. In addition, in a case in which the zoom ratio of the image IM displayed on the display 430 is reduced, the processor 410 may increase the reference value for the display of the graphic indicator GI.

According to an embodiment of the disclosure, the processor 410 may determine, based on the depth information DI, the distance of at least one subject included in the image IM.

For example, a subject positioned in an area farther than a predetermined first reference distance may have a high frequency, and an amount of a graphic indicator displayed on the subject may be great. In a case in which the subject included in the first area of the image IM is positioned in a far distance (or long distance) from the electronic device 401 (e.g., the camera module 420 of the electronic device 401) compared to the first reference distance, the processor 410 may increase the reference value for the display of the graphic indicator GI. For example, the first reference distance may refer to the distance value for determining whether the subject is positioned in the long distance.

A subject positioned in an area closer than a predetermined second reference distance may have a low frequency, and an amount of a graphic indicator displayed on the subject may be low. In a case in which the subject included in the first area of the image IM is positioned in a close distance (or short distance) from the electronic device 401 compared to the second reference distance, the processor 410 may reduce the reference value for the display of the graphic indicator GI. For example, the second reference distance may refer to the distance value for determining whether the subject is positioned in the short distance.

The camera module 420 may capture an image IM and transmit the captured image IM to the processor 410.

The camera module 420 may include at least one camera. For example, the camera module 420 may include one or more cameras.

The camera module 420 may include an image sensor. For example, the image sensor may include a plurality of pixels. Each of the plurality of pixels may include one or more photodiodes (e.g., two or more photodiodes).

According to an embodiment of the disclosure, in a case in which the camera module 420 includes one camera, the camera may include an image sensor including the plurality of photodiodes. The processor 410 may obtain a phase difference for at least one subject included in the image IM using the image sensor including the plurality of photodiodes, and may generate, based on the obtained phase difference, the depth information DI.

According to another embodiment of the disclosure, in a case in which the camera module 420 includes two or more cameras, each of the two or more cameras may include an image sensor including one or more photodiodes. The processor 410 may obtain a phase difference for at least one subject included in the image IM using the two or more cameras, and may generate, based on the obtained phase difference, the depth information DI.

The display 430 may display the image IM. For example, the display 430 may be implemented by a touch screen. The display 430 may receive a touch input IN of the user.

The memory 440 may store data related to the operation of the electronic device 401. For example, the memory 440 may be implemented by a non-volatile memory or a volatile memory.

According to an embodiment of the disclosure, the memory 440 may store the depth information DI generated by the processor 410. In addition, the memory 440 may also store the contrast information on the image IM.

The input device 450 may receive the input signal IN by the user, and may transmit the input signal IN to the processor 410. For example, the processor 410 may receive the input signal IN through the display 430 and/or the input device 450.

According to an embodiment of the disclosure, the input device 450 may refer to a device which controls the focus of the camera included in the camera module 420 via the input signal IN by the user. The input device 450 may be implemented substantially identically or similarly to the input device 250 described with reference FIG. 2. For example, the input device 450 may include a device which may receive the input of the user, such as a Physical User Interface (PUI), a button, and a jog.

Figure 5A:
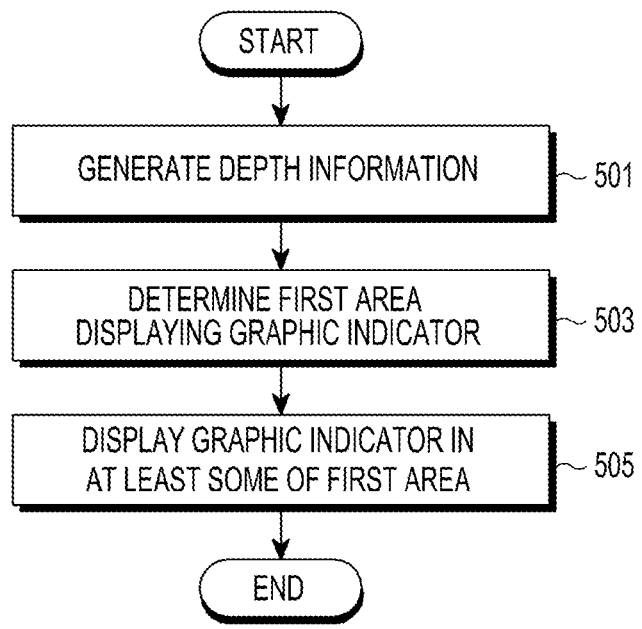
FIGS. 5A and 5B are flowcharts illustrating an operation of an electronic device according to various embodiments of the disclosure.
Figure 5B:
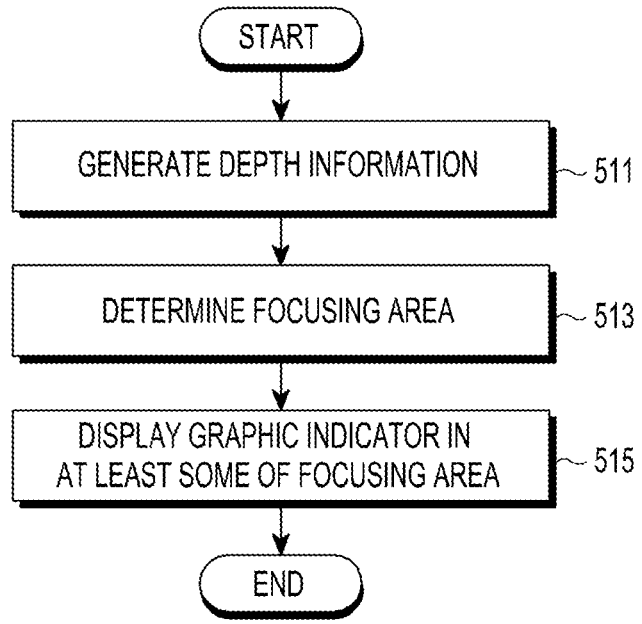

FIGS. 5A and 5B are flowcharts illustrating an operation of an electronic device according to various embodiments of the disclosure.

Referring to FIG. 5A, the processor 410 (e.g., the processor 410 of FIG. 4) may generate the depth information DI on the image IM obtained using the camera included in the camera module 420 at operation 501. For example, the processor 410 may generate, based on the information on the plurality of pixels included in the image IM, the depth information DI.

The processor 410 may control the focus of the camera included in the camera module 420 according to the input signal IN.

In a case in which the focus of the camera included in the camera module 420 is controlled, the processor 410 may determine, based on the depth information DI and the contrast information, the first area, displaying the graphic indicator for indicating the focusing area, in the image IM displayed on the display 430 at operation 503.

The processor 410 may display the graphic indicator GI on at least some of the first area at operation 505. For example, the processor 410 may determine, based on the depth information DI and the contrast information, the subject included in the first area, and may display the graphic indicator GI on at least some of the determined subject.

Referring to FIG. 5B, the processor 410 (e.g., the processor 410 of FIG. 4) may generate the depth information DI on the image IM obtained using the camera included in the camera module 420 at operation 511. For example, the processor 410 may generate, based on the information on the plurality of pixels included in the image IM, the depth information DI.

The processor 410 may determine the focusing area on which the camera is focused in the image IM (e.g., preview image) displayed on the display 430 at operation 513. For example, the processor 410 may determine the focusing area according to the input signal IN by the user.

The processor 410 may recognize, based on the input signal IN by the user and the depth information DI, the focusing area of the image IM.

The processor 410 may display, based on the depth information DI, the graphic indicator GI on at least some a portion of the focusing area at operation 515. For example, the processor 410 may determine, based on the depth information DI, the subject included in the focusing area, and may display the graphic indicator GI on at least some of the subject.

Figure 6:
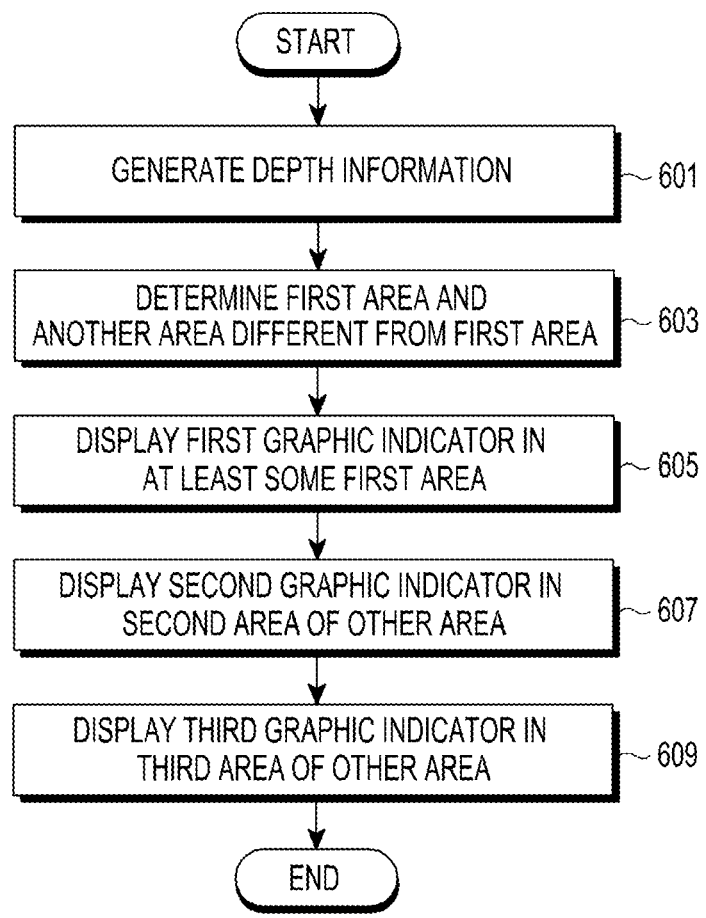
FIG. 6 is a flowchart illustrating an operation of an electronic device according to various embodiments of the disclosure.

FIG. 6 is a flowchart illustrating an operation of an electronic device according to various embodiments of the disclosure.

Referring to FIG. 6, the processor 410 (e.g., the processor 410 of FIG. 4) may generate the depth information DI on the image IM obtained using the camera included in the camera module 420 at operation 601.

The processor 410 may determine the first area, in which the first graphic indicator is displayed, in the image IM (e.g., preview image) displayed on the display 430 at operation 603. The processor 410 may determine, based on the depth information DI and the contrast information, the first area, in which the first graphic indicator is displayed for indicating the focusing area of the image IM.

The processor 410 may display the first graphic indicator using the first attribute (e.g., the first color) on at least some of the subject included in the first area at operation 605.

The processor 410 may recognize the area (hereinafter, referred to as the out-focus area) different from the first area corresponding to the focusing area in the image IM displayed on the display 430 using the depth information DI. For example, the processor 410 may recognize the area (hereinafter, referred to as the second area) in a far distance (or long distance) from the focusing area and the area (hereinafter, referred to as the third area) in a close distance (or short distance) from the focusing area, in the image.

The processor 410 may display the second graphic indicator using the second attribute (e.g., the second color) in the second area corresponding to the long distance in the out-focus area at operation 607.

The processor 410 may display the third graphic indicator using the third attribute (e.g., the third color) in the third area corresponding to the short distance in the out-focus area at operation 609.

The electronic device 401 of the disclosure displays the graphic indicators having different attributes (e.g., different colors) on one subject included in the image IM. Therefore, the electronic device 401 can intuitively recognize the focusing area, and can efficiently set the focusing area.

Figure 7A:
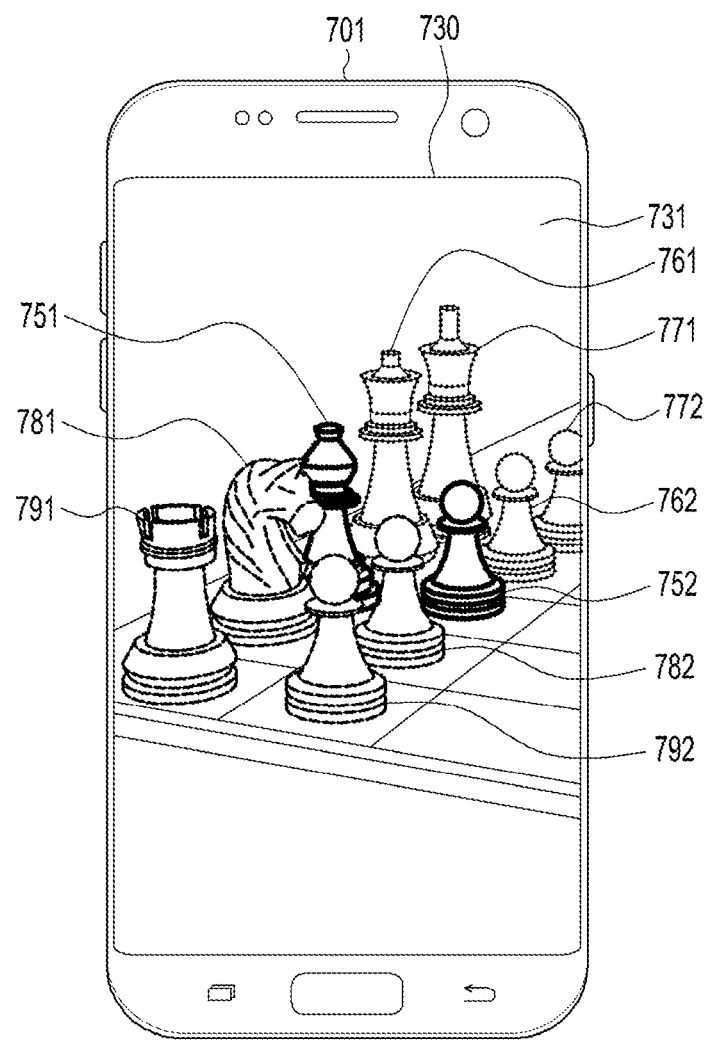
FIGS. 7A, 7B, and 7C illustrate user interfaces for describing a graphic indicator provided from an electronic device according to various embodiments of the disclosure.
Figure 7B:
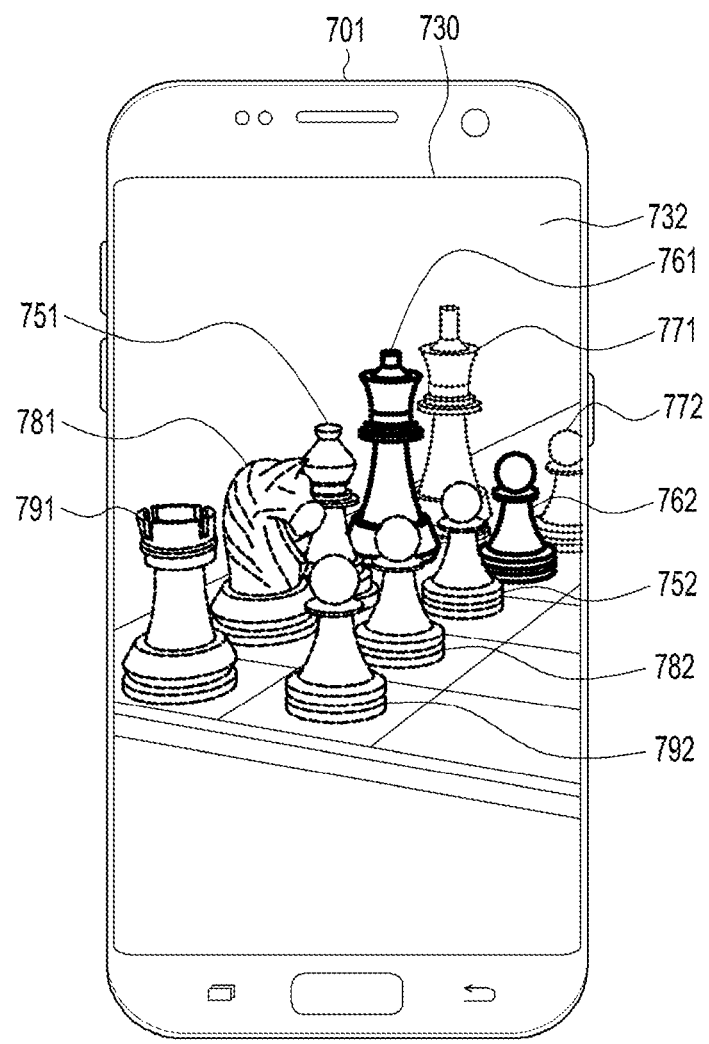
Figure 7C:
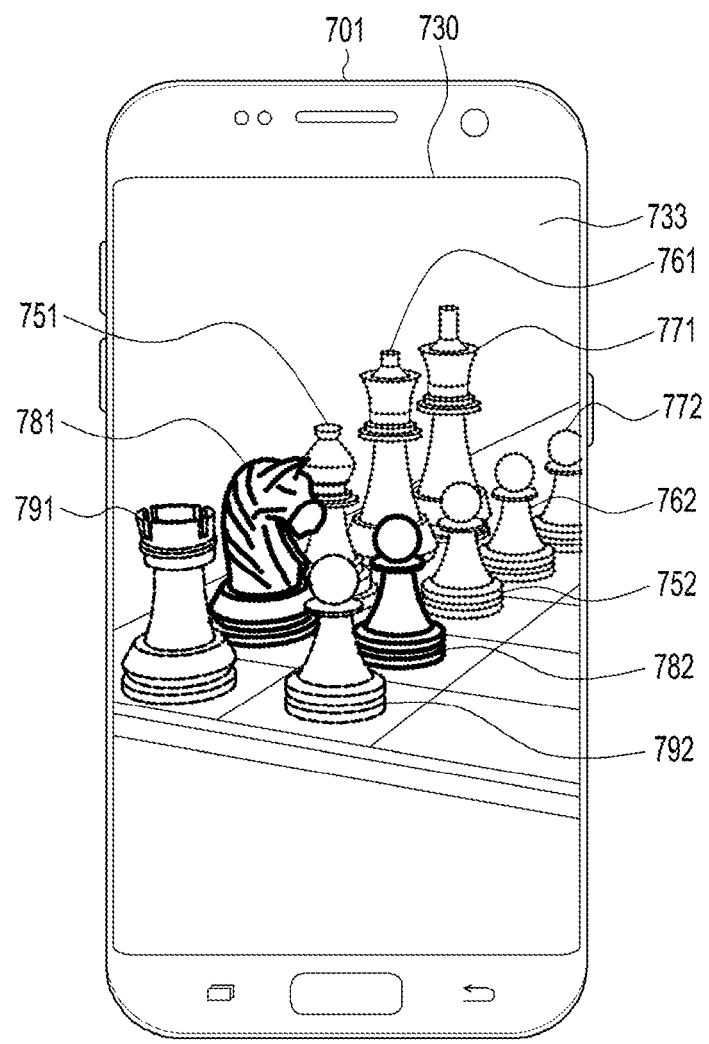

FIGS. 7A, 7B, and 7C illustrate user interfaces for describing a graphic indicator provided from an electronic device according to various embodiments of the disclosure.

Referring to FIGS. 7A, 7B, and 7C, an electronic device 701 may be implemented substantially identically or similarly to the electronic device 401 described with reference to FIG. 4.

The electronic device 701 may display the image IM on a display 730. The image IM may include a plurality of subjects 751, 752, 761, 762, 771, 772, 781, 782, 791, and 792.

Referring to FIG. 7A, the electronic device 701 may focus on the center portion of a first image 731 using the camera. For example, the electronic device 701 may focus on first subjects 751 and 752 positioned in the center portion of the first image 731.

According to an embodiment of the disclosure, the electronic device 701 may display the first graphic indicator of the first attribute (e.g., the first color) on at least some of the first subjects 751 and 752. For example, the first graphic indicator may refer to a marker including a line and a point of a 'green'.

The electronic device 701 may display the second graphic indicator of the second attribute (e.g., the second color) on at least some of second subjects 761, 762, 771, and 772 positioned far away from the electronic device 701 (e.g., the camera of the electronic device 701) compared to the focusing area. For example, the second graphic indicator may refer to a marker including a line and a point of a 'blue'.

The electronic device 701 may display the third graphic indicator of the third attribute (e.g., the third color) on at least some of third subjects 781, 782, 791, and 792 positioned close to the electronic device 701 (e.g., the camera of the electronic device 701) compared to the focusing area. For example, the third graphic indicator may refer to a marker including a line and a point of a 'red'.

Referring to FIG. 7B, the electronic device 701 may focus on a long distance portion of a second image 732 using the camera. For example, the electronic device 701 may focus on first subjects 761 and 762 positioned in the long distance portion of the second image 732.

According to an embodiment of the disclosure, the electronic device 701 may display the first graphic indicator of the first attribute (e.g., the first color) on at least some of the first subjects 761 and 762. For example, the first graphic indicator may refer to a marker including a line and a point of a 'green'.

The electronic device 701 may display the second graphic indicator of the second attribute (e.g., the second color) on at least some of second subjects 771 and 772 positioned far away from the electronic device 701. For example, the second graphic indicator may refer to a marker including a line and a point of a 'blue'.

The electronic device 701 may display the third graphic indicator of the third attribute (e.g., the third color) on at least some of third subjects 751, 752, 781, 782, 791, and 792 positioned close to the electronic device 701. For example, the third graphic indicator may refer to a marker including a line and a point of a 'red'.

Referring to FIG. 7C, the electronic device 701 may focus on a short distance portion of a third image 733 using the camera. For example, the electronic device 701 may focus on first subjects 781 and 782 positioned in the short distance portion of the third image 733.

According to an embodiment of the disclosure, the electronic device 701 may display the first graphic indicator of the first attribute (e.g., the first color) on at least some of the first subjects 781 and 782. For example, the first graphic indicator may refer to a marker including a line and a point of a 'green'.

The electronic device 701 may display the second graphic indicator of the second attribute (e.g., the second color) on at least some of second subjects 751, 752, 761, 762, 771, and 772 positioned far away from the electronic device 701. For example, the second graphic indicator may refer to a marker including a line and a point of a 'blue'.

The electronic device 701 may display the third graphic indicator of the third attribute (e.g., the third color) on at least some of third subjects 791 and 792 positioned close to the electronic device 701. For example, the third graphic indicator may refer to a marker including a line and a point of a 'red'.

Figure 8:
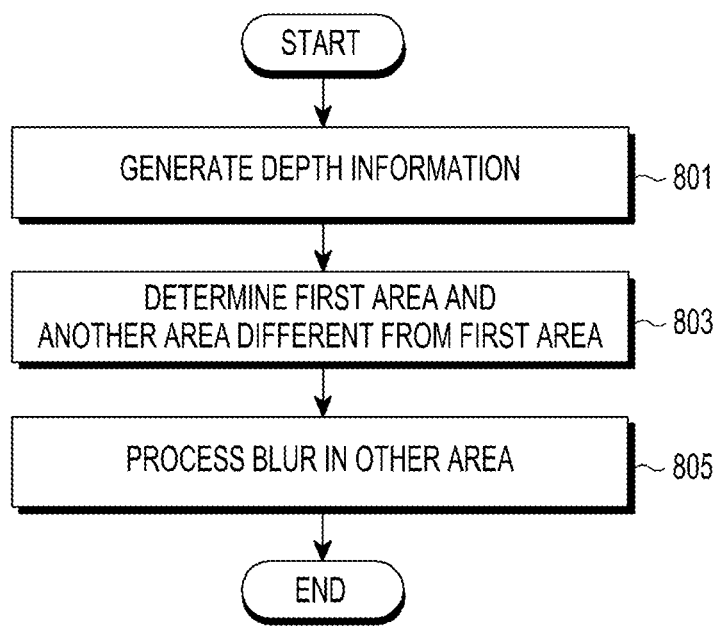
FIG. 8 is a flowchart illustrating an operation of an electronic device according to various embodiments of the disclosure.

FIG. 8 is a flowchart illustrating an operation of an electronic device according to various embodiments of the disclosure.

Referring to FIG. 8, the processor 410 (e.g., the processor 410 of FIG. 4) may generate the depth information DI on at least one subject included in the image IM using the image IM obtained using the camera included in the camera module 420 at operation 801.

The processor 410 may determine, based on the depth information DI and the contrast information, the first area corresponding to the focusing area on which the camera is focused and the other area (hereinafter, referred to as the out-focus area), different from the first area, in the image IM (e.g., preview image) displayed on the display 430 at operation 803. For example, the out-focus area may refer to the area on which the camera is not focused.

The processor 410 may distinguish and display the focusing area and the out-focus area. For example, the processor 410 may distinguish and display the focusing area and the out-focus area by adding a specific effect in the out-focus area.

According to an embodiment of the disclosure, the processor 410 may add a blur effect in the out-focus area at operation 805. In addition, the processor 410 may control, based on the depth information DI, the strength of the blur effect of the out-focus area.

Figure 9:
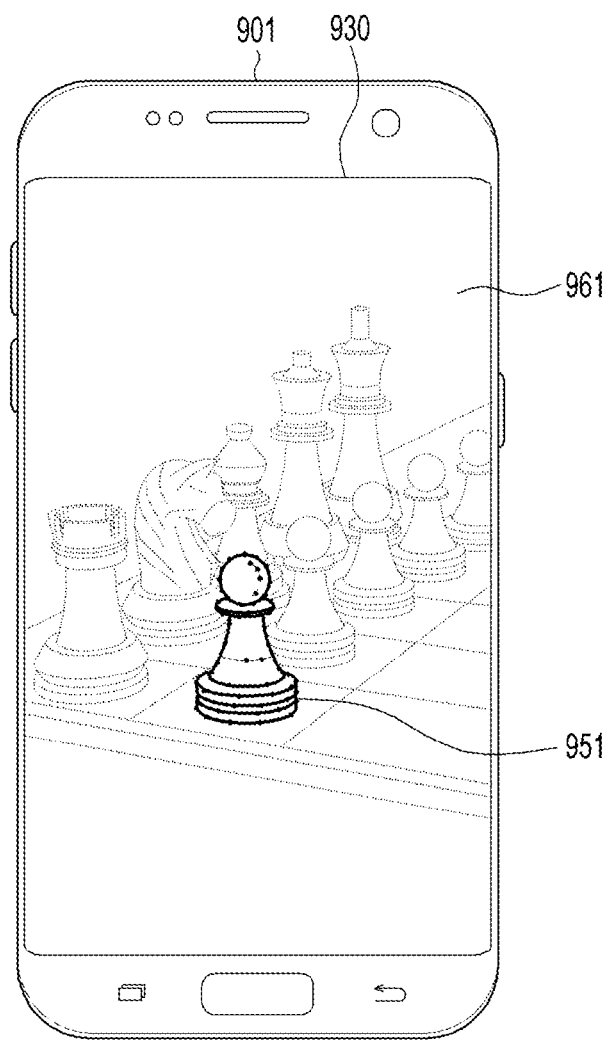
FIG. 9 illustrates a user interface for describing a graphic indicator provided from an electronic device according to various embodiments of the disclosure.

FIG. 9 illustrates a user interface for describing a graphic indicator provided from an electronic device according to various embodiments of the disclosure.

Referring to FIG. 9, an electronic device 901 may be implemented substantially identically or similarly to the electronic device 401 described with reference to FIG. 4. The electronic device 901 may display the image IM on a display 930.

The electronic device 901 may focus on an area in which a subject 951 of an image 961 is positioned, using the camera. For example, the focusing area may be an area in which the subject 951 of the image 961 is positioned.

The electronic device 901 may display the graphic indicator on at least some of the subject 951 included in the image 961 displayed on the display 430. The electronic device 901 may add a blur effect in the out-focus area and display the out-focus area on the display 930.

Figure 10:
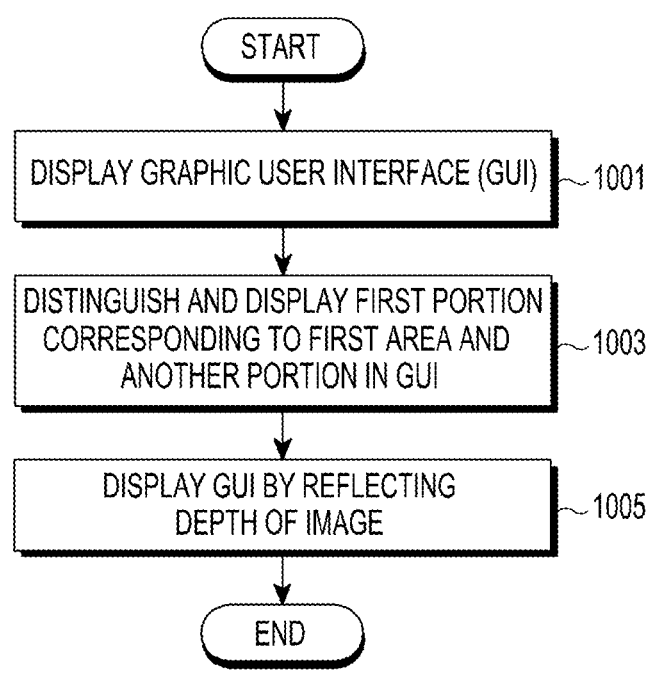
FIG. 10 is a flowchart illustrating an operation of an electronic device according to various embodiments of the disclosure.

FIG. 10 is a flowchart illustrating an operation of an electronic device according to various embodiments of the disclosure.

Referring to FIG. 10, the processor 410 (e.g., the processor 410 of FIG. 4) may display a GUI for a manual focus control at operation 1001.

The processor 410 may distinguish and display, based on the depth information DI, a portion corresponding to the focusing area of the image IM and a portion corresponding to the area (hereinafter, referred to as the out-focus area) different from the focusing area, in the GUI at operation 1003. For example, the processor 410 may display the portion corresponding to the focusing area of the GUI using an attribute equal to that of the graphic interface for the focusing area. In addition, the processor 410 may display the portion corresponding to the out-focus area of the GUI using an attribute equal to that of the graphic interface for the out-focus area.

The processor 410 may display the GUI by reflecting the depth of the image IM (e.g., preview image) displayed on the display 430 at operation 1005. For example, the processor 410 may display the portion corresponding to the focusing area of the image IM in the GUI by reflecting the depth of the image IM. In a case in which the depth of the focusing area is deep, the processor 410 may widely (or largely) display the portion corresponding to the focusing area of the image IM in the GUI. Conversely, in a case in which the depth of the focusing area is shallow, the processor 410 may narrowly (or small) display the portion corresponding to the focusing area of the image IM in the GUI.

FIGS. 11A, 11B, 11C, 11D, 11E, and 11F illustrate user interfaces for a graphic user interface provided from an electronic device according to various embodiments of the disclosure.

Referring to FIGS. 11A, 11B, 11C, 11D, 11E, and 11F, an electronic device 1101 may be implemented substantially identically or similarly to the electronic device 401 described with reference to FIG. 4.

The electronic device 1101 may display the image IM on a display 1130. The image IM may include a plurality of subjects 1151, 1152, 1161, 1162, 1171, 1172, 1181, 1182, 1191, and 1192.

Figure 11A:
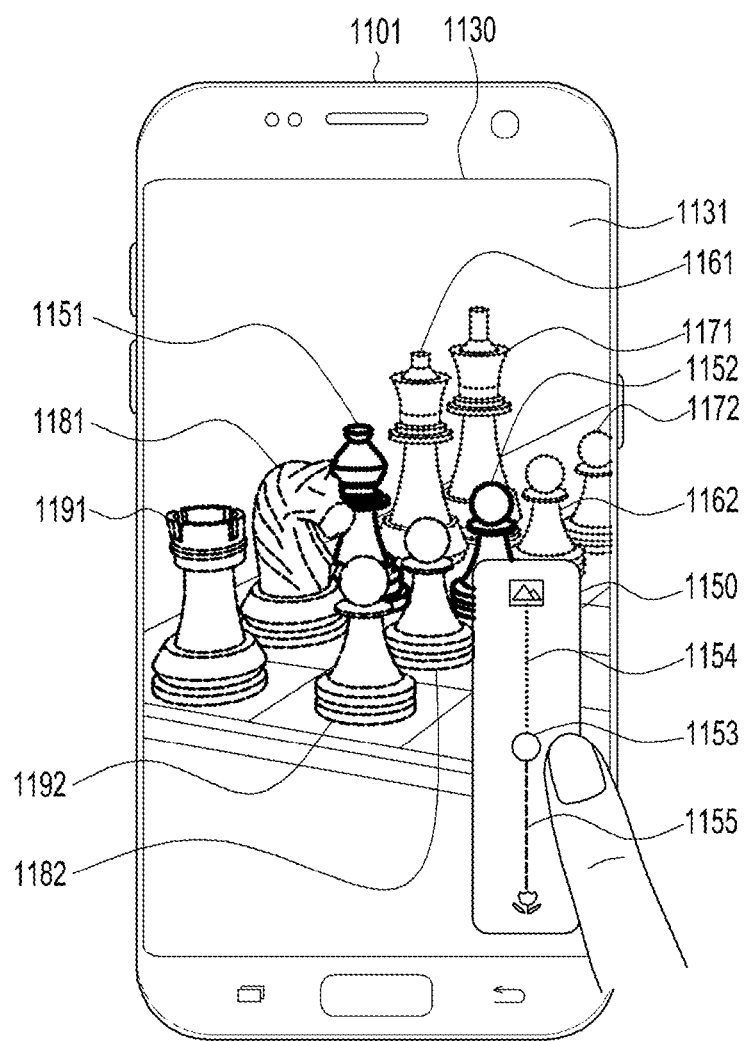
FIGS. 11A, 11B, 11C, 11D, 11E, and 11F illustrate user interfaces for a graphic user interface provided from an electronic device according to various embodiments of the disclosure.

Referring to FIG. 11A, the electronic device 1101 may focus on the center portion of a first image 1131 using the camera. For example, the electronic device 1101 may focus on subjects 1151 and 1152 positioned in the center portion of the first image 1131.

According to an embodiment of the disclosure, the electronic device 1101 may display a graphic user interface 1150 for manually controlling the focus. The graphic user interface 1150 may include a movement object 1153 for moving the focusing area. For example, the movement object 1153 may move vertically in response to a touch input by the user. The processor 410 (e.g., the processor 410 of FIG. 4) may enable the position of the movement object 1153 to correspond to the position of the focusing area. For example, the processor 410 may control the focusing area by moving the lens of the camera included in the camera module 420 (e.g., the camera module 420 of FIG. 4), in response to the input signal IN for controlling the position for the movement object 1153.

According to an embodiment of the disclosure, the movement object 1153 may be displayed by an attribute identical or similar to the first attribute (e.g., the first color) indicating the first graphic indicator displayed on the subjects 1151 and 1152 included in the first area corresponding to the focusing area. For example, in a case in which the first graphic indicator is displayed in a 'green', the movement object 1153 may be displayed by the 'green'.

The graphic user interface 1150 may further include a first portion 1154 corresponding to the second area of the long distance based on the focusing area and a second portion 1155 corresponding to the third area of the short distance based on the focusing area.

The first portion 1154 may be displayed by an attribute identical or similar to the second attribute (e.g., the second color) indicating the second graphic indicator displayed on the subjects 1161, 1162, 1171, and 1172 included in the second area. For example, in a case in which the second graphic indicator is displayed in a 'blue, the first portion 1154 may be displayed in the 'blue'. In the same manner, the second portion 1155 may be displayed by an attribute identical or similar to the third attribute (e.g., the third color) indicating the third graphic indicator displayed on the subjects 1181, 1182, 1191, and 1192 included in the third area. For example, in a case in which the third graphic indicator is displayed in a 'red', the second portion 1155 may be displayed in the 'red'.

Figure 11B:
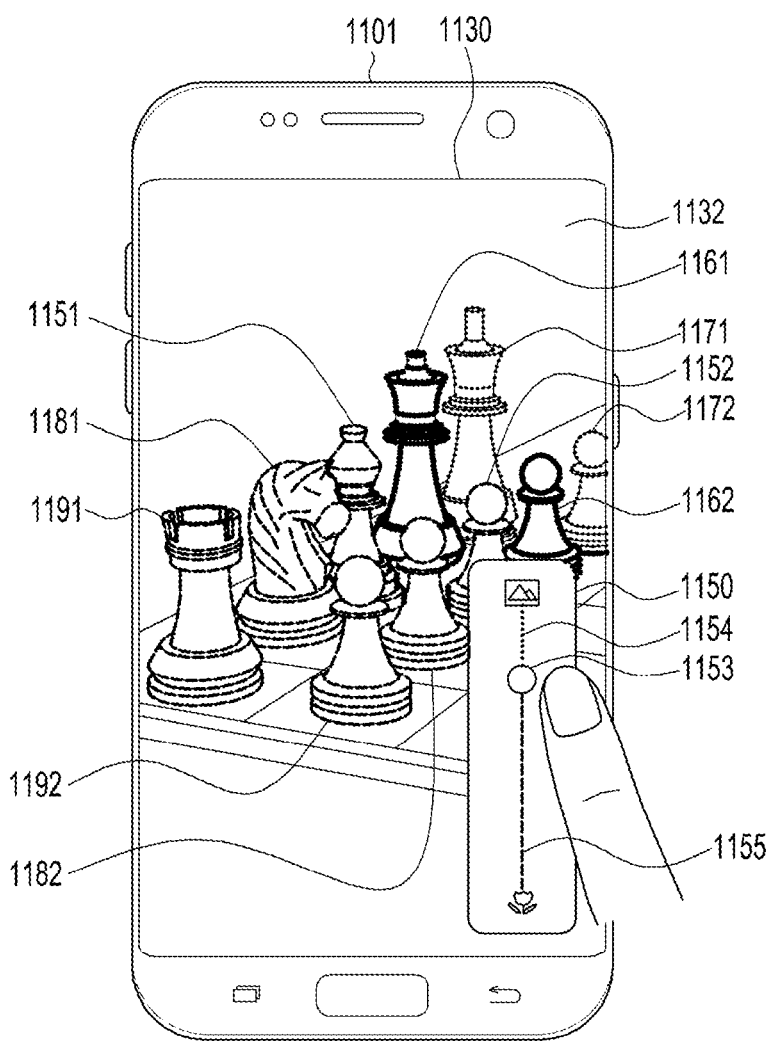

Referring to FIG. 11B, the electronic device 1101 may focus on a portion corresponding to the long distance of a second image 1132, in response to the input signal IN. For example, in a case in which the movement object 1153 of the graphic user interface 1150 moves upwards, the electronic device 1101 may focus on the subjects 1161 and 1162 positioned in a portion corresponding to the long distance of the second image 1132.

For example, in a case in which the movement object 1153 is moved upwards the electronic device 1101 may display the first graphic indicator of the first attribute (e.g., green) on the subjects 1161 and 1162 included in the first area corresponding to the focusing area, may display the second graphic indicator of the second attribute (e.g., blue) on the subjects 1171 and 1172 included in the second area, and may display the third graphic indicator of the third attribute (e.g., red) on the subjects 1151, 1152, 1181, 1182, 1191, and 1192 included in the third area.

Figure 11C:
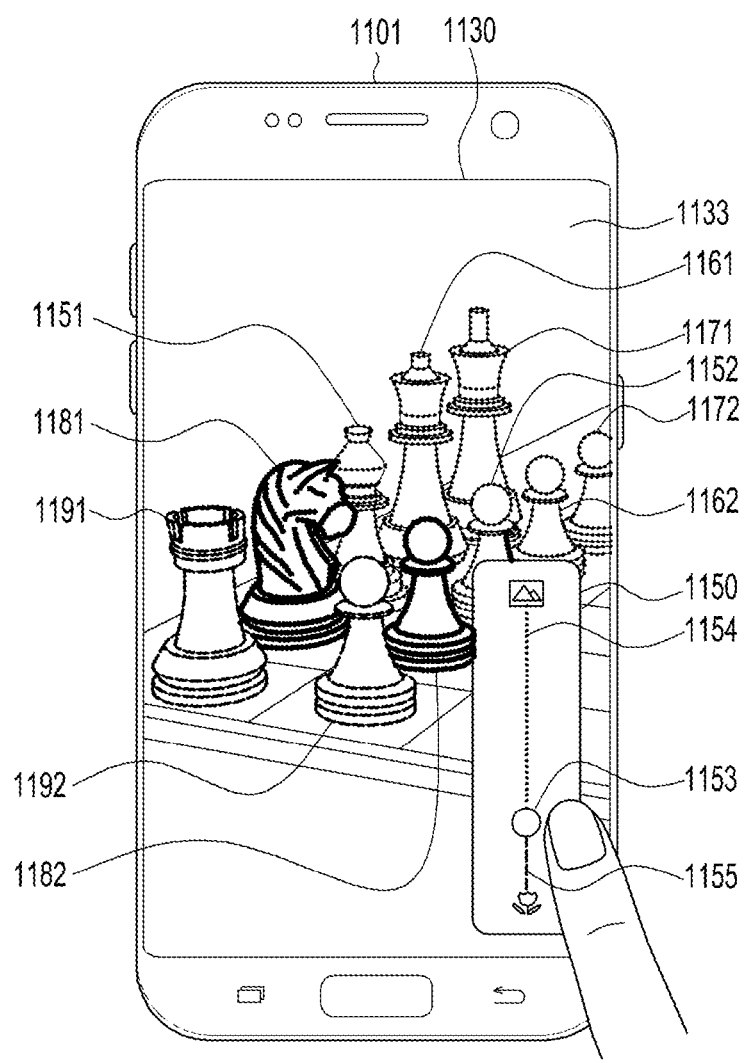

Referring to FIG. 11C, the electronic device 1101 may focus on a portion corresponding to the short distance of a third image 1133, in response to the input signal IN. For example, in a case in which the movement object 1153 of the graphic user interface 1150 moves downwards, the electronic device 1101 may focus on the subjects 1181 and 1182 positioned in a short distance portion of the third image 1133.

For example, in a case in which the movement object 1153 is moved downwards, the electronic device 1101 may display the first graphic indicator of the first attribute (e.g., green) on the subjects 1181 and 1182 included in the first area corresponding to the focusing area, may display the second graphic indicator of the second attribute (e.g., blue) on the subjects 1151, 1152, 1161, 1162, 1171, and 1172 included in the second area, and may display the third graphic indicator of the third attribute (e.g., red) on the subjects 1191 and 1192 included in the third area.

Figure 11D:
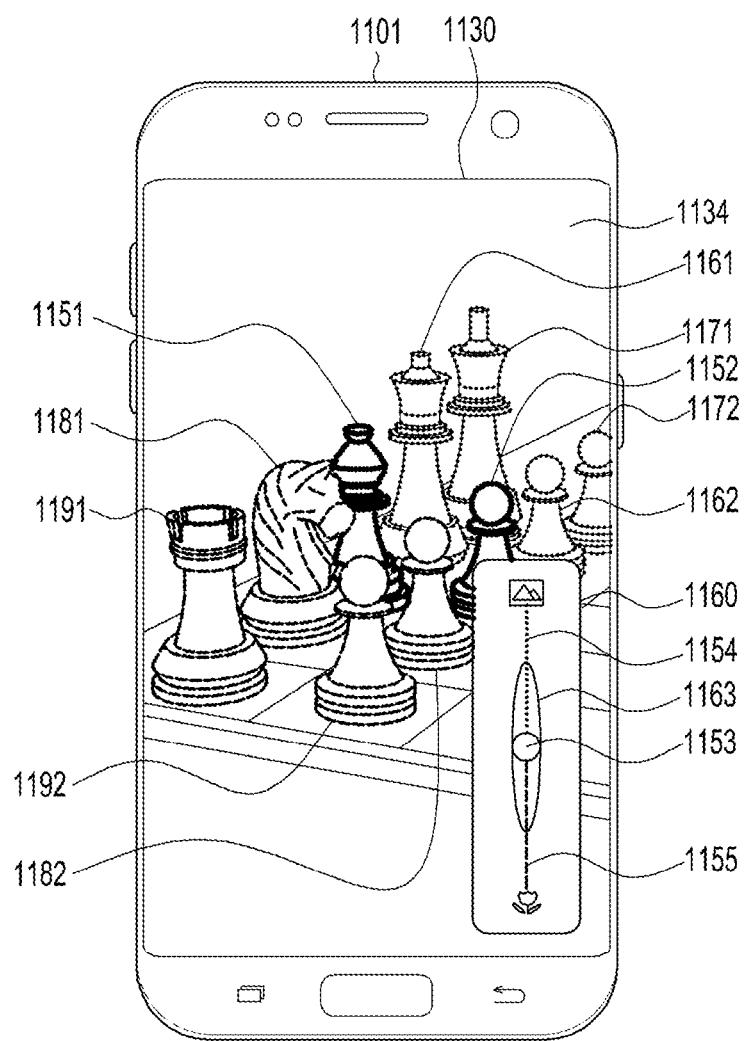

Referring to FIG. 11D, the electronic device 1101 may focus on the center portion of a fourth image 1134 using the camera. For example, the electronic device 1101 may focus on the objects 1151 and 1152 positioned in the center portion of the fourth image 1134.

The processor 410 (e.g., the processor 410 of FIG. 4) may display a focus position display portion 1163 indicating the position of the focusing area. The processor 410 may display the focus position display portion 1163, by reflecting the depth to the focusing area. The processor 410 may control the size of the focus position display portion 1163, in order to increase or reduce the focus control resolution.

According to an embodiment of the disclosure, the electronic device 1101 may display a graphic user interface 1160 for manually controlling the focus. The graphic user interface 1160 may include the movement object 1153 for moving the focusing area and an expanded focus position display portion 1163.

For example, in a case in which the depth of the focusing area is deep, the processor 410 may small display a portion (e.g., the focus position display portion 1163) corresponding to the focusing area of the image IM, in the graphic user interface 1160, automatically or according to the input of the user. In addition, in a case in which the depth of the focusing area is shallow, the processor 410 may largely display the portion (e.g., the focus position display portion 1163) corresponding to the focusing area of the image IM, in the graphic user interface 1160, automatically or according to the input of the user.

For example, in a case in which the size of the focus position display portion 1163 is expanded, a section for controlling the focusing area via the movement object 1153 may increase. In a case in which the size of the focus position display portion 1163 is reduced, the section for controlling the focusing area via the movement object 1153 may be reduced. For example, the processor 410 may control the focusing area more accurately, in the expanded focus position display portion 1163, according to the movement of the movement object 1153.

Figure 11E:
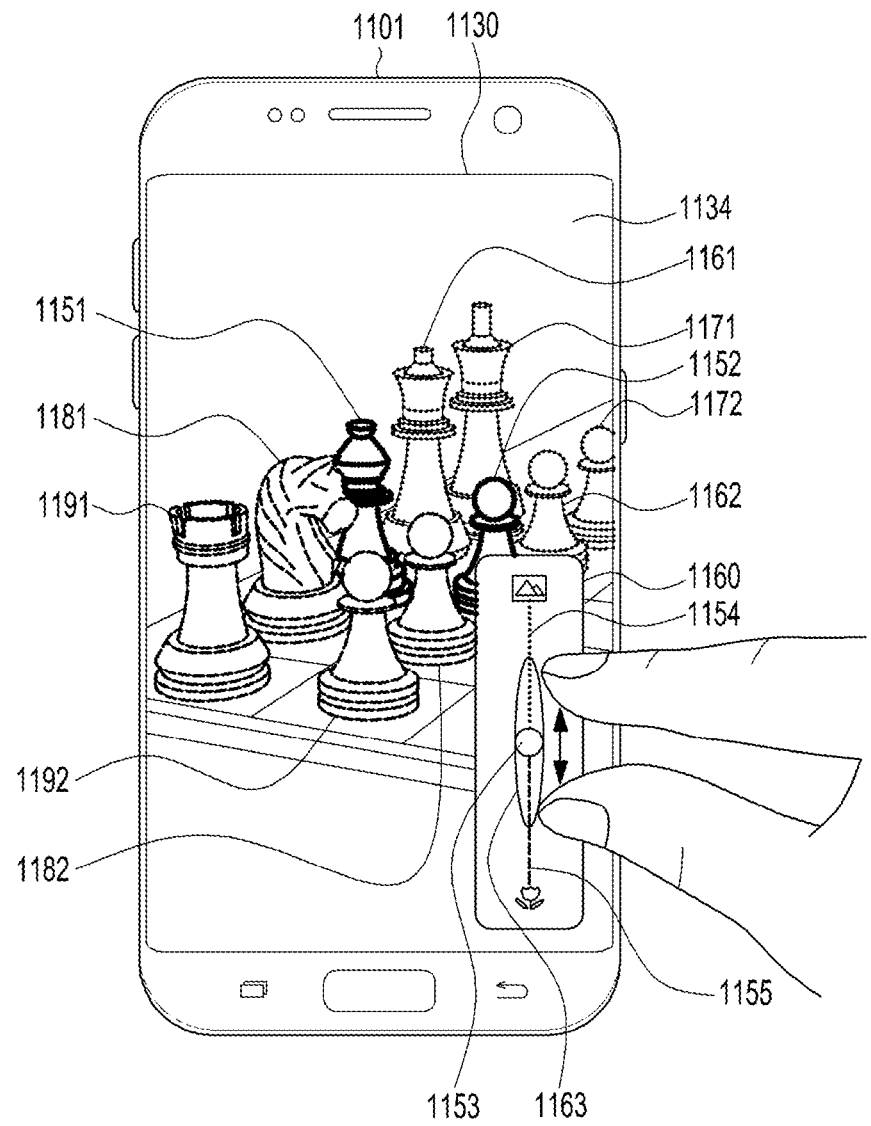

Referring to FIG. 11E, the electronic device 1101 may control the size of the focus position display portion 1163 corresponding to the focusing area. The electronic device 1101 may control the size of the focus position display portion 1163 indicating the focusing area, in response to an input for controlling the size of the focus position display portion 1163. For example, for more accurate focus control, the electronic device 1101 may expand or reduce the area corresponding to the focusing area.

According to an embodiment of the disclosure, the electronic device 1101 may increase the focus position display portion 1163 indicating the focusing area, in response to an input for expanding the size of the focus position display portion 1163. For example, the electronic device 1101 may narrowly control the focus position display portion 1163 indicating the focusing area, in response to an input for reducing the size of the movement object 1153.

According to another embodiment of the disclosure, the electronic device 1101 may control the size or length of the graphic user interface 1160. For example, in a case in which the size of the graphic user interface 1160 is expanded, a section for controlling the focusing area via the movement object 1153 may increase. In a case in which the size of the graphic user interface 1160 is reduced, the section for controlling the focusing area via the movement object 1153 may be reduced. For example, the processor 410 may control the focusing area more accurately, in the expanded graphic user interface 1160, according to the movement of the movement object 1153.

Figure 11F:
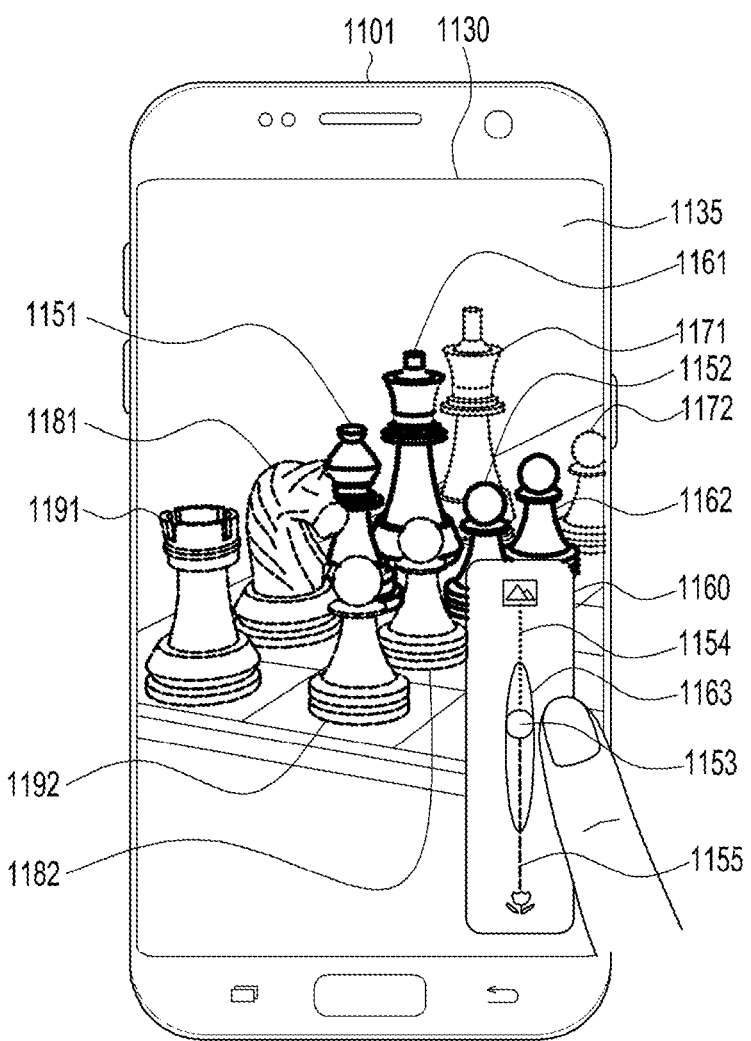

Referring to FIG. 11F, the electronic device 1101 may focus on the center portion and some of the long distance portion of a fifth image 1135, using the camera.

According to an embodiment of the disclosure, the electronic device 1101 may display the graphic user interface 1160 for manually controlling the focus. The graphic user interface 1160 may include the movement object 1153 for moving the focusing area and the focus position display portion 1163 expanded with respect to the focusing area of the fifth image 1135. For example, in a case in which the movement object 1153 is moved upwards based on the center portion of the graphic user interface 1160, the focusing area may also be moved, based on the center portion, to the long distance area. For example, the electronic device 1101 may focus, based on the position of the movement object 1153, on objects 1151, 1152, 1171, and 1172 positioned in the center portion and some of the long distance portion of the fifth image 1135.

The electronic device 1101 may control the focus more accurately according to the movement of the movement object 1153, using the expanded focus position display portion 1163.

Figure 12:
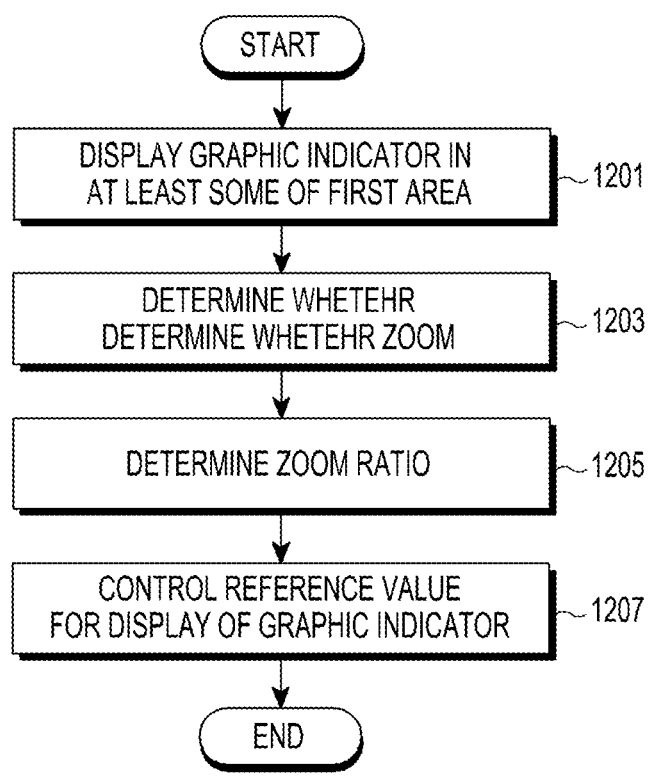
FIG. 12 is a flowchart illustrating an operation of an electronic device according to various embodiments of the disclosure.

FIG. 12 is a flowchart illustrating an operation of an electronic device according to various embodiments of the disclosure.

Referring to FIG. 12, the processor 410 (e.g., the processor 410 of FIG. 4) may display the graphic indicator on at least some (e.g., at least some of the subject) of the first area corresponding to the focusing area of the image IM, using the depth information DI and the contrast information of the image IM at operation 1201. In addition, the processor 410 may also display the graphic indicator on at least some (e.g., at least some of the subject) of the area (hereinafter, referred to as the out-focus area) different from the first area of the image IM.

The processor 410 may determine whether the zoom function of the camera included in the camera module 420 (e.g., the camera module 420 of FIG. 4) is performed at operation 1203.

In a case in which the zoom function of the camera is performed, the processor 410 may determine the zoom ratio of the camera at operation 1205.

The processor 410 may control, based on the zoom ratio and the depth information DI, the reference value for the display of the graphic indicator at operation 1207. For example, the reference value may refer to the contrast threshold value for displaying the graphic indicator.

For example, the processor 410 may obtain the contrast information on the image IM via the camera module 420. In a case in which the contrast greater than the contrast threshold value is detected with respect to the subject included in the image IM, the processor 410 may display the graphic indicator on the subject included in the image IM.

According to an embodiment of the disclosure, the processor 410 may increase the resolution of the image IM and/or the depth resolution included in the depth information DI according to a zoom expansion. In addition, the processor 410 may match the pixel value of the expanded image IM and the expanded depth information DI with each other.

According to an embodiment of the disclosure, the processor 410 may reduce the resolution of the image IM and/or the depth resolution included in the depth information DI according to a zoom reduction. In addition, the processor 410 may match the pixel value of the reduced image IM and the reduced depth information DI with each other.

According to an embodiment of the disclosure, in the case of the zoom expansion (e.g., a state in which the zoom ratio is greater than 1.0), the processor 410 may reduce the reference value for the display of the graphic indicator. In addition, in the case of the zoom reduction (e.g., a state in which the zoom ratio is less than 1.0), the processor 410 may increase the reference value for the display of the graphic indicator.

FIGS. 13A, 13B, 13C, 13D, and 13E illustrate user interfaces for describing the graphic indicator provided from the electronic device according to various embodiments of the disclosure.

Referring to FIGS. 13A, 13B, 13C, 13D, and 13E, an electronic device 1301 may be implemented substantially identically or similarly to the electronic device 401 described with reference to FIG. 4.

Figure 13A:
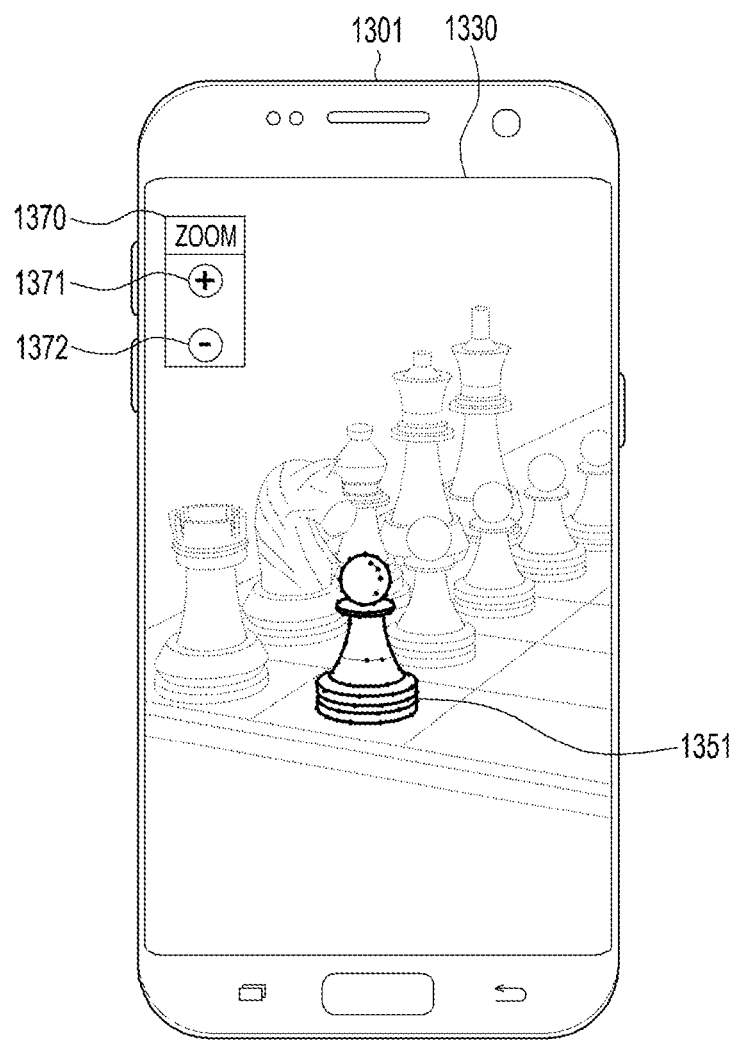
FIGS. 13A, 13B, 13C, 13D, and 13E illustrate user interfaces for describing a graphic indicator provided from an electronic device according to various embodiments of the disclosure.

Referring to FIG. 13A, the electronic device 1301 may display the image IM on a display 1330. The electronic device 1301 may focus on an area corresponding to the position of a subject 1351, in the image IM. In addition, the electronic device 1301 may display the graphic indicator on at least some of the subject 1351.

The electronic device 1301 may display a zoom function window 1370 for performing the zoom function on the display 1330. The zoom function window 1370 may include an expansion key 1371 for the zoom expansion and a reduction key 1372 for the zoom reduction.

Figure 13B:
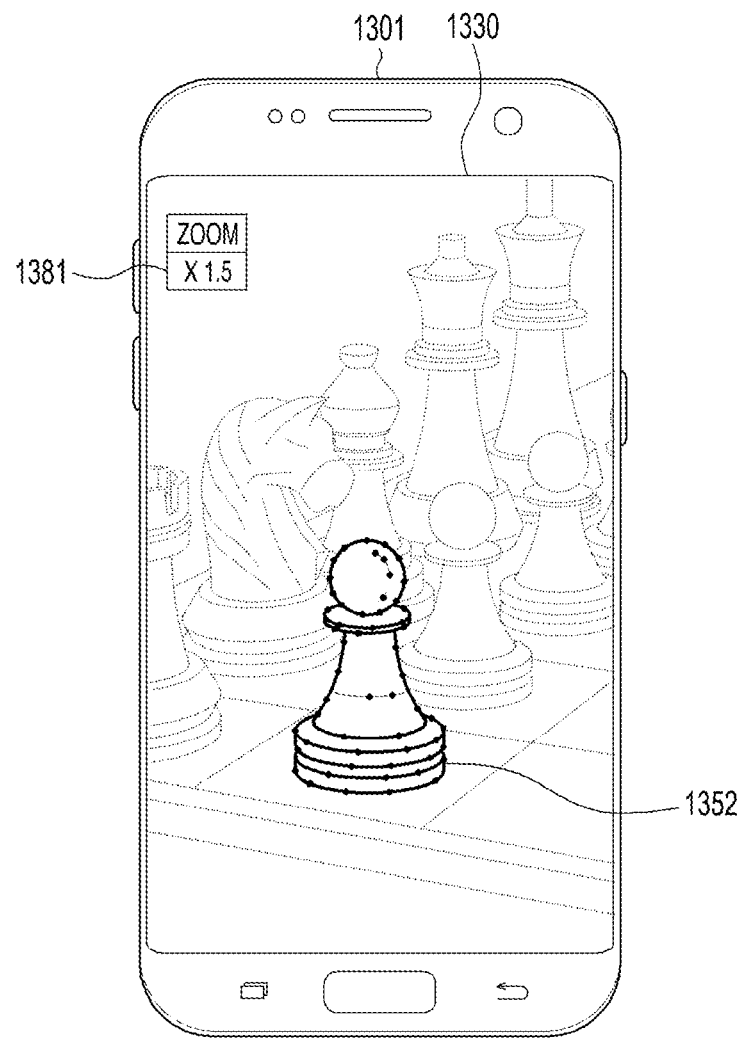

Referring to FIG. 13B, the electronic device 1301 may expand the image IM, in response to a touch input for the expansion key 1371. For example, the electronic device 1301 may expand the image IM by 1.5 times, in response to the touch input. The electronic device 1301 may display an information window 1381 for the expansion of the image IM.

In a case in which the image IM is expanded, the electronic device 1301 may display a graphic indicator 1352 on the expanded subject. For example, the frequency for pixels corresponding to the expanded subject may be reduced. Therefore, the amount of the graphic indicator 1352 displayed on the expanded subject may be reduced. The electronic device 1301 may display the graphic indicator 1352 corresponding to the expanded subject.

Figure 13C:
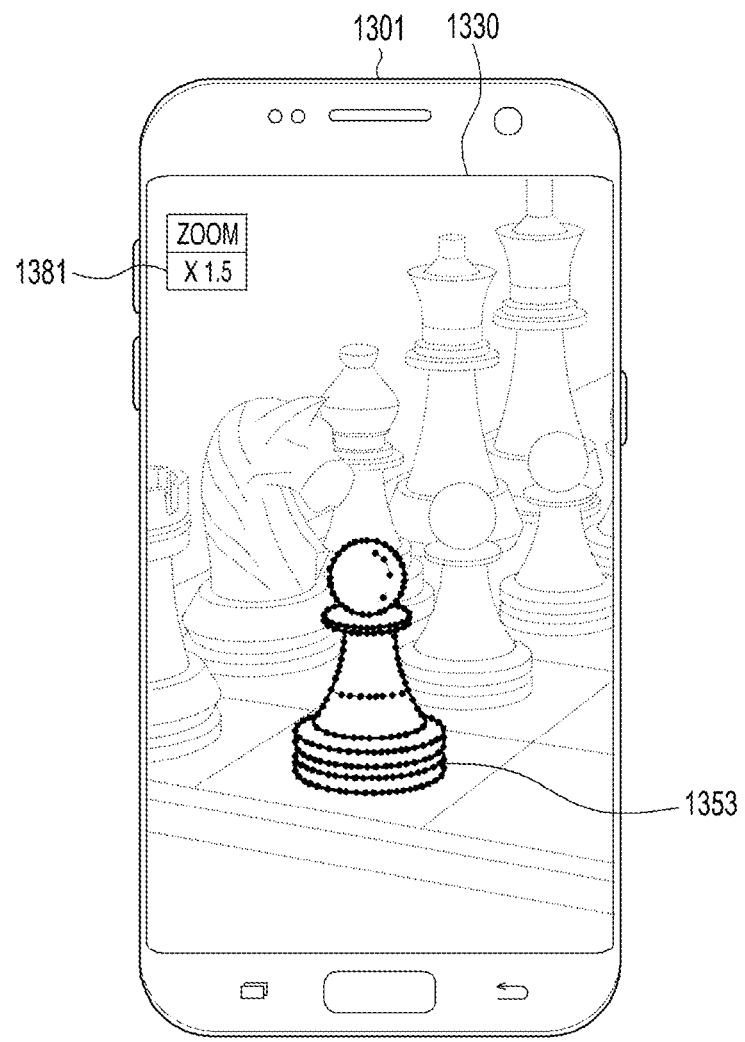

Referring to FIG. 13C, the electronic device 1301 may expand the image IM, in response to a touch input for the expansion key 1371. In a case in which the image IM is expanded, the electronic device 1301 may reduce the reference value for the display of the graphic indicator.

In a case in which the reference value is reduced, the electronic device 1301 may increase the amount of a graphic indicator 1353 displayed on the expanded subject. The electronic device 1301 may display the graphic indicator 1353 corresponding to the reduced reference value.

Figure 13D:
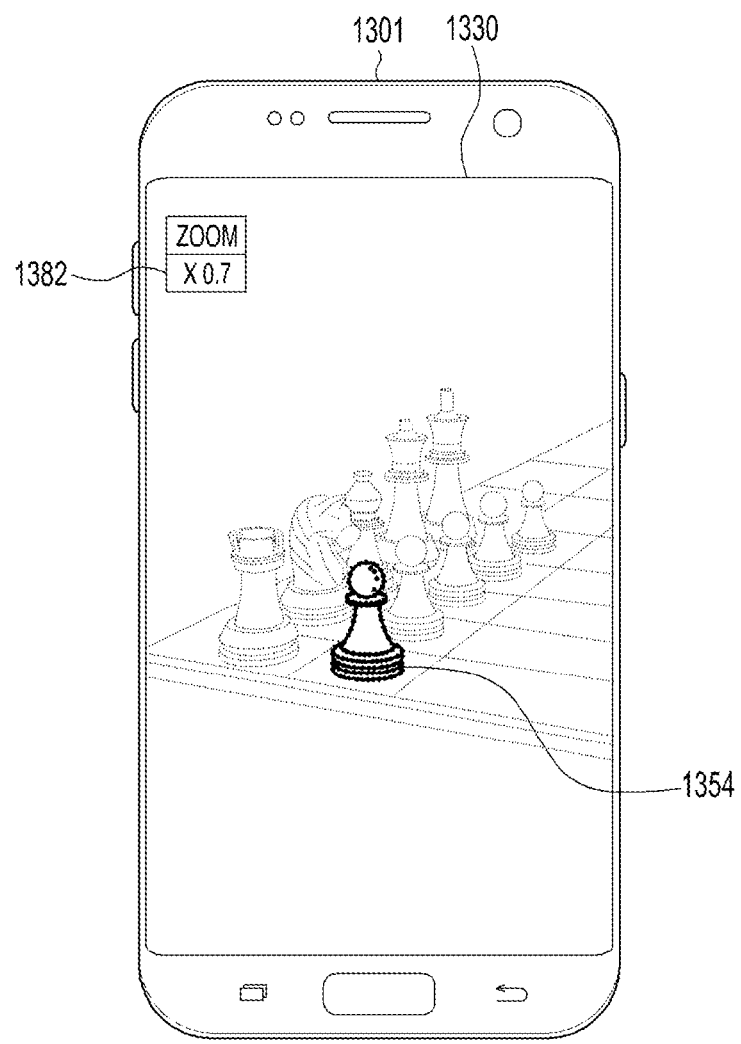

Referring to FIG. 13D, the electronic device 1301 may reduce the image IM in response to a touch input for the reduction key 1372. For example, the electronic device 1301 may expand the image IM by 0.7 times, in response to the touch input. The electronic device 1301 may display an information window 1382 for the reduction of the image IM.

In a case in which the image IM is reduced, the electronic device 1301 may display a graphic indicator 1354 on the reduced subject. For example, the frequency for pixels corresponding to the reduced subject may be increased. Therefore, the amount of the graphic indicator 1354 displayed on the reduced subject may be increased. The electronic device 1301 may display the graphic indicator 1354 corresponding to the reduced subject.

Figure 13E:
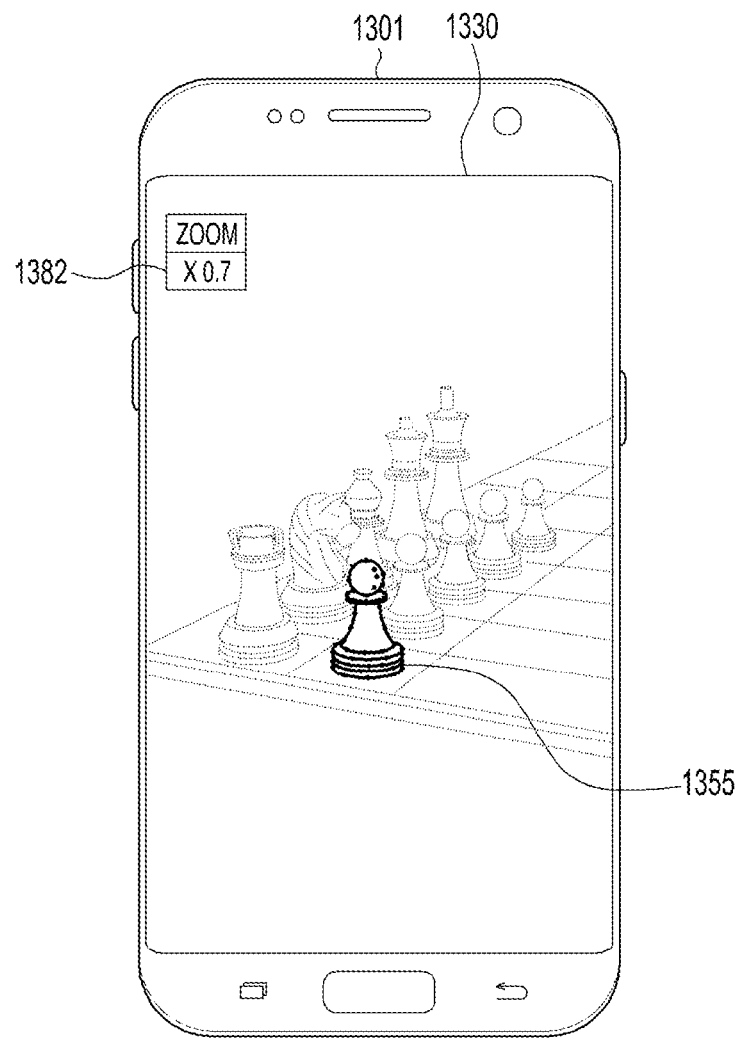

Referring to FIG. 13E, the electronic device 1301 may reduce the image IM, in response to the touch input for the reduction key 1372. In a case in which the image IM is reduced, the electronic device 1301 may increase the reference value for the display of the graphic indicator.

In a case in which the reference value is increased, the electronic device 1301 may increase the amount of a graphic indicator 1355 displayed on the reduced subject. The electronic device 1301 may display the graphic indicator 1355 corresponding to the increased reference value.

Figure 14:
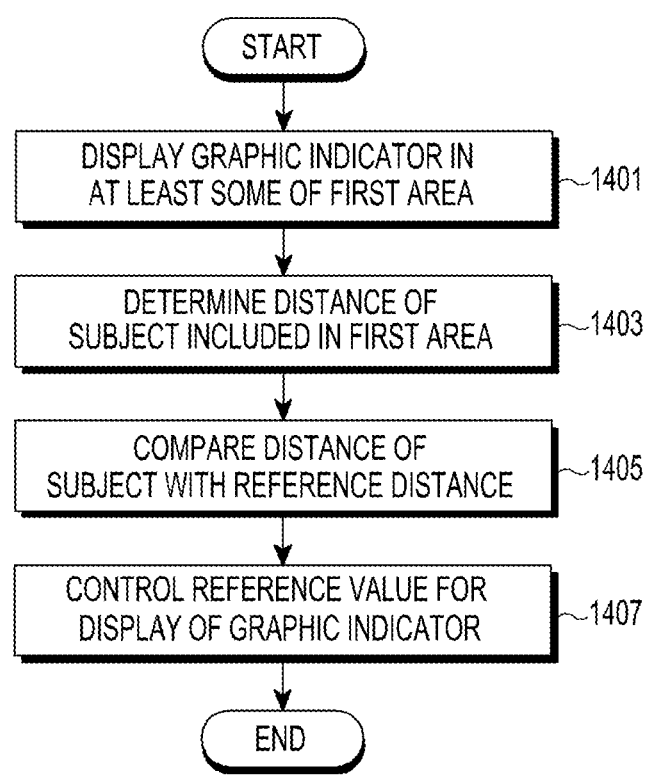
FIG. 14 is a flowchart illustrating an operation of an electronic device according to various embodiments of the disclosure.

FIG. 14 is a flowchart illustrating an operation of an electronic device according to various embodiments of the disclosure.

Referring to FIG. 14, the processor 410 (e.g., the processor 410 of FIG. 4) may display the graphic indicator on at least some of the first area corresponding to the focusing area using the depth information DI and the contrast information of the image IM at operation 1401.

The processor 410 may determine, based on the depth information DI, the distance of at least one subject included in the image IM displayed on the display 430.

For example, the processor 410 may determine, based on the depth information DI, the distance of at least one subject included in the first area corresponding to the focusing area of the image IM (e.g., preview image) displayed on the display 430 at operation 1403. In addition, the processor 410 may also determine, based on the depth information DI, the distance of at least one subject included in the area (hereinafter, referred to as the out-focus area) different from the first area of the image IM displayed on the display 430.

The processor 410 may compare the determined distance of the subject with a reference distance at operation 1405. For example, the reference distance may refer to a distance for determining whether the distance between the electronic device 401 and the subject is the long distance or the short distance. In addition, the reference distance may include a first reference distance for determining whether the subject is positioned a long distance away and a second reference distance for determining whether the subject is positioned a short distance away.

The processor 410 may control the reference value for displaying the graphic indicator according to the result of the comparison at operation 1407.

For example, in a case in which the distance at which the subject is positioned is less than the first reference distance, the processor 410 may determine that the subject is positioned a short distance away. In a case in which the subject is positioned a short distance away, the processor 410 may reduce the reference value for displaying the graphic indicator.

For example, in a case in which the distance at which the subject is positioned is equal to or greater than the second reference distance, the processor 410 may determine that the subject is positioned a long distance away. In a case in which the subject is positioned a long distance away, the processor 410 may increase the reference value for displaying the graphic indicator.

Figure 15A:
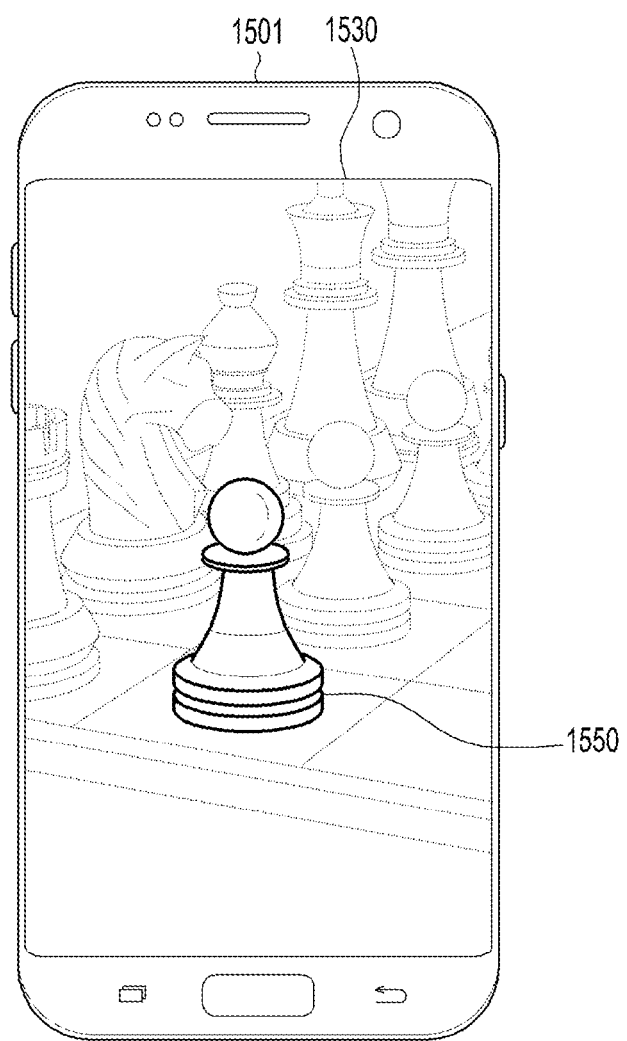
FIGS. 15A, 15B, and 15C illustrate user interfaces for describing a graphic indicator provided from an electronic device according to various embodiments of the disclosure.
Figure 15B:
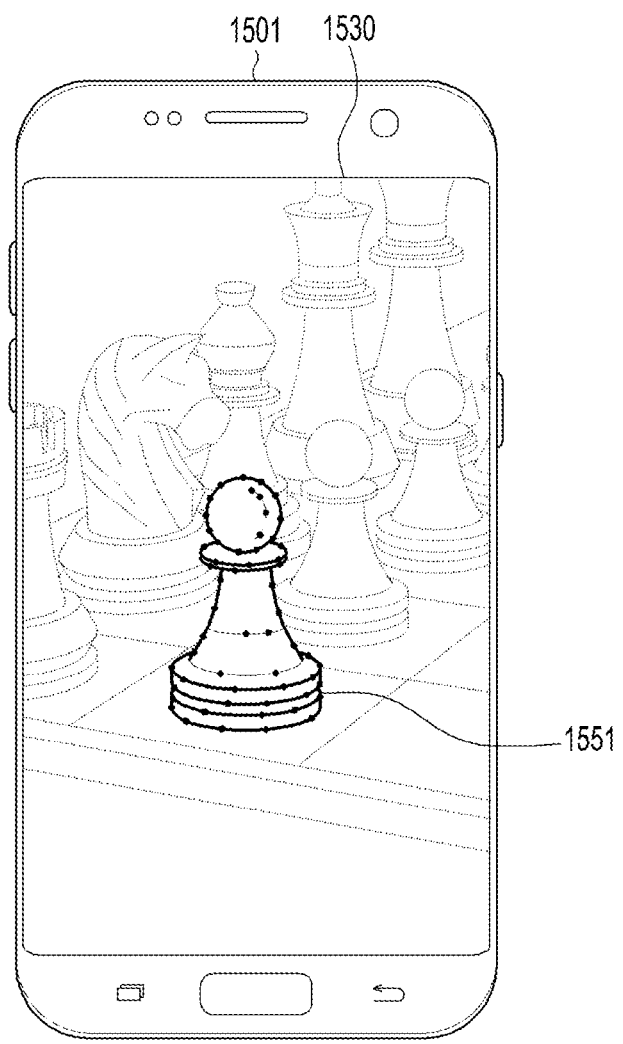
Figure 15C:
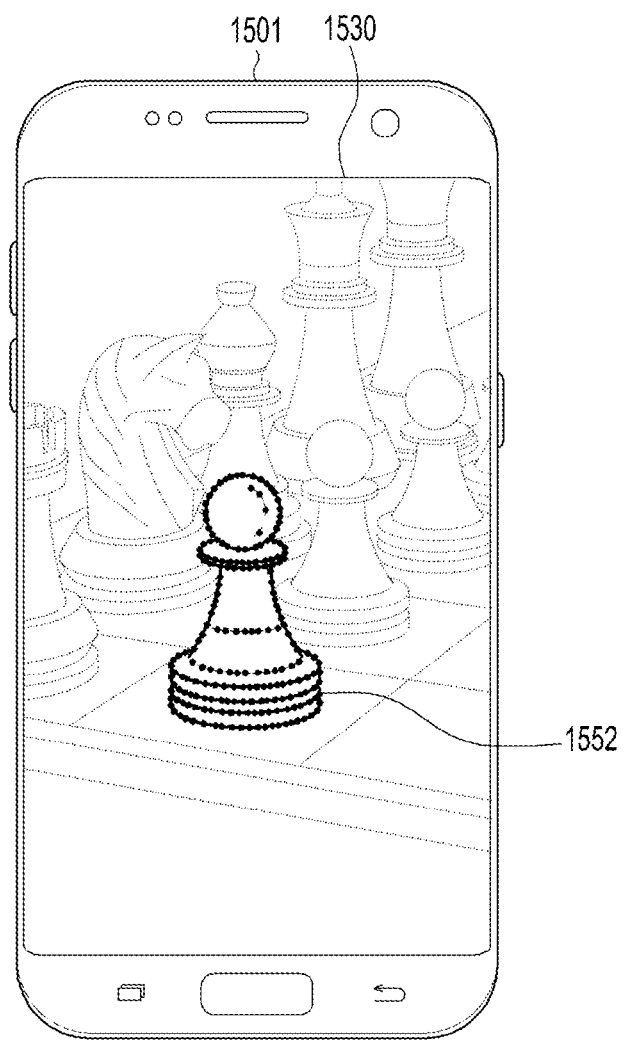

FIGS. 15A, 15B, and 15C illustrate user interfaces for describing a graphic indicator provided from an electronic device according to various embodiments of the disclosure.

Referring to FIG. 15A, an electronic device 1501 may display the image IM on a display 1530. The electronic device 1501 may focus on an area corresponding to the position of a subject 1550, in the image IM. In addition, the electronic device 1501 may display the graphic indicator on at least some of the subject 1550.

The electronic device 1501 may determine, based on the depth information DI, the distance of the subject 1550.

Referring to FIG. 15B, the electronic device 1501 may display a graphic indicator 1551 corresponding to the subject 1550 positioned a short distance away.

In a case in which it is determined that the subject 1550 is positioned a short distance away, the electronic device 1501 may display the graphic indicator 1551 on the subject 1550. For example, in a case in which the subject 1550 is positioned a short distance away, the frequency for pixels corresponding to the subject 1550 may be reduced. Therefore, an amount of the graphic indicator 1551 displayed on the subject 1550 may be reduced. In a case in which the amount of the graphic indicator 1551 is reduced, the manual focus operation may not be easy. Therefore, the electronic device 1501 may increase the amount of the graphic indicator 1551, by reducing the reference value for the display of the graphic indicator 1551, so that the manual focus operation is easy.

Referring to FIG. 15C, the electronic device 1501 may display a graphic indicator 1552 corresponding to the reduced reference value.

In a case in which it is determined that the subject 1550 is positioned a short distance away, the electronic device 1501 may reduce the reference value for the display of the graphic indicator. For example, the electronic device 1501 may reduce the reference value for the display of the graphic indicator 1551, so that the manual focus operation is easy.

In a case in which the reference value is reduced, the electronic device 1501 may increase the amount of the graphic indicator 1552 displayed on the subject 1550. Therefore, the amount of the graphic indicator 1552 increases, and thus the manual focus operation may be easy.

An electronic device according to various embodiments may include a camera, a display, a memory, and a processor. The processor may be configured to generate, based on information on pixels included in an image including at least one subject obtained using the camera, depth information corresponding to at least one subject, to determine, based on the depth information, a first area displaying a first graphic indicator for indicating a focusing area on which the camera is focused, in the image displayed on the display, in a case in which the focus of the camera is controlled, and to display the first graphic indicator on at least some of the subject included in the first area.

The processor may be configured to display the first graphic indicator using a first attribute, on at least some of the subject included in the first area, and to display, based on the depth information, a graphic indicator using an attribute different from the first attribute, on at least some of another area different from the first area of the image.

The processor may be configured to determine, based on the depth information, a second area, farther from the electronic device than the first area, and a third area, closer to the electronic device than the first area, among the other area, to display a second graphic indicator using a second attribute on at least some of the second area, and to display a third graphic indicator using a third attribute on at least some of the third area.

The processor may be configured to display a graphic interface for obtaining an input signal which controls the focus of the camera on the display, to display a first portion corresponding to the first area using the first attribute, to display a second portion corresponding to the second area using the second attribute, and to display a third portion corresponding to the third area using the third attribute, in the graphic interface.

The processor may be configured to determine the depth of the focusing area and to display an attribute corresponding to the depth on the graphic interface.

The processor may be configured to determine, based on the depth information and contrast information of the image, the first area.

The processor may be configured to control, based on the depth information, a reference value for the display of the first graphic indicator.

The processor may be configured to reduce the reference value for the display of the first graphic indicator in a case in which the subject included in the first area is positioned closer to the electronic device than a predetermined reference distance.

The processor may be configured to control, based on the zoom ratio of the image and the depth information, the reference value for the display of the first graphic indicator.

The processor may be configured to reduce the reference value for the display of the first graphic indicator in a case in which the zoom ratio of the image increases, and to increase the reference value for the display of the first graphic indicator in a case in which the zoom ratio of the image is reduced.

A method of operating an electronic device according to various embodiments may include generating, based on information on pixels included in an image including at least one subject obtained using a camera included in the electronic device, depth information corresponding to at least one subject, determining, based on the depth information, a first area displaying a first graphic indicator for indicating a focusing area on which the camera is focused, in the image displayed on a display, in a case in which a focus of the camera is controlled, and displaying the first graphic indicator on at least some of the subject included in the first area.

The displaying the first graphic indicator may include displaying the first graphic indicator using a first attribute, on at least some of the subject included in the first area, and displaying a graphic indicator using an attribute different from the first attribute, on at least some of another area different from the first area of the image.

The method may further include determining, based on the depth information, a second area farther from the electronic device than the first area and a third area closer to the electronic device than the first area, among the other area, and displaying a second graphic indicator using a second attribute on at least some of the second area and displaying a third graphic indicator using a third attribute on at least some of the third area.

The method may further include displaying a graphic interface for receiving an input signal which controls the focus of the camera, on the display, and displaying a first portion corresponding to the first area using the first attribute, displaying a second portion corresponding to the second area using the second attribute, and displaying a third portion corresponding to the third area using the third attribute, in the graphic interface.

The displaying the graphic interface may include determining the depth of the focusing area and displaying an attribute corresponding to the depth on the graphic interface.

The determining the first area may include determining, based on the depth information and contrast information of the image, the first area.

The method may further include controlling, based on the depth information, a reference value for the display of the first graphic indicator.

The controlling the reference value may include reducing the reference value for the display of the first graphic indicator, in a case in which the subject included in the first area is positioned closer to the electronic device than a predetermined reference distance.

The method may further include controlling, based on the zoom ratio of the image and the depth information, the reference value for the display of the first graphic indicator.

An electronic device according to various embodiments may include a camera, a display, a memory, and a processor. The processor may be configured to generate, based on information on pixels included in an image including at least one subject obtained using the camera, depth information corresponding to at least one subject, to determine a focusing area on which the camera is focused according to an input signal, in the image displayed on the display, and to display, based on the depth information, the first graphic indicator on at least some of the subject included in the focusing area.

Certain aspects of the disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the disclosure can be easily construed by programmers skilled in the art to which the disclosure pertains.

At this point it should be noted that the various embodiments of the preset disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the disclosure as described above. Alternatively, one or more processors operating in accordance with stored instructions may implement the functions associated with the various embodiments of the disclosure as described above. If such is the case, it is within the scope of the disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the disclosure can be easily construed by programmers skilled in the art to which the disclosure pertains.

A computer-readable recording medium according to various embodiments may store a program for executing a method of operating an electronic device. The method may include generating, based on information on pixels included in an image including at least one subject obtained using a camera included in the electronic device, depth information corresponding to at least one subject, determining, based on the depth information, a first area displaying a first graphic indicator for indicating a focusing area on which the camera is focused, in the image displayed on a display, in a case in which a focus of the camera is controlled, and displaying the first graphic indicator on at least some of the subject included in the first area.

Each of the components of the electronic device according to the disclosure may be implemented by one or more components and the name of the corresponding component may vary depending on a type of the electronic device. In various embodiments of the disclosure, the inspection apparatus may include at least one of the above-described elements. Some of the above-described elements may be omitted from the electronic device, or the inspection apparatus may further include additional elements. Further, some of the components of the electronic device according to the various embodiments may be combined to form a single entity, and thus, may equivalently execute functions of the corresponding elements prior to the combination.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a camera;
a display;
a memory; and
at least one processor configured to:
obtain, based on information on pixels included in an image including at least one subject obtained using the camera, depth information corresponding to the at least one subject,
in response to manually controlling a focus of lens included in the camera, identify, based on the depth information, a first area displaying a first graphic indicator for indicating a focusing area on which the camera is focused, in the image displayed on the display, and
display, on at least part of an outline of the at least one subject included in the first area, the first graphic indicator including a plurality of dots of a specific color,
wherein the first graphic indicator on the at least part of the outline of the at least one subject is displayed based on a detection of contrast of an edge of the at least one subject, and
wherein a display style of the first graphic indicator displayed on the at least part of the outline is based on the depth information.

2. The electronic device of claim 1, wherein the at least one processor is further configured to:
display the first graphic indicator using a first attribute on at least some of the at least one subject included in the first area, and
display, based on the depth information, a graphic indicator using an attribute different from the first attribute, on at least some of another area different from the first area of the image.

3. The electronic device of claim 2, wherein the at least one processor is further configured to:
determine, based on the depth information, a second area farther from the electronic device than the first area and a third area closer to the electronic device than the first area, among the other area,
display a second graphic indicator using a second attribute on at least some of the second area, and
display a third graphic indicator using a third attribute on at least some of the third area.

4. The electronic device of claim 3, wherein the at least one processor is further configured to:
display a graphic interface for obtaining an input signal which controls the focus of the camera on the display,
display a first portion corresponding to the first area using the first attribute,
display a second portion corresponding to the second area using the second attribute, and
display a third portion corresponding to the third area using the third attribute, in the graphic interface.

5. The electronic device of claim 4, wherein the at least one processor is further configured to determine the depth of the focusing area and to display an attribute corresponding to the depth on the graphic interface.

6. The electronic device of claim 1, wherein the at least one processor is further configured to determine, based on the depth information and contrast information of the image, the first area.

7. The electronic device of claim 6, wherein the at least one processor is further configured to control, based on the depth information, a reference value for the display of the first graphic indicator.

8. The electronic device of claim 7, wherein the at least one processor is further configured to reduce the reference value for the display of the first graphic indicator, in a case in which the at least one subject included in the first area is positioned closer to the electronic device than a predetermined reference distance.

9. The electronic device of claim 6, wherein the at least one processor is further configured to control, based on a zoom ratio of the image and the depth information, the reference value for the display of the first graphic indicator.

10. The electronic device of claim 9, wherein the at least one processor is further configured to:
reduce the reference value for the display of the first graphic indicator in a case in which the zoom ratio of the image increases, and
increase the reference value for the display of the first graphic indicator in a case in which the zoom ratio of the image is reduced.

11. A method of operating an electronic device, the method comprising:
obtaining, based on information on pixels included in an image including at least one subject obtained using a camera included in the electronic device, depth information corresponding to the at least one subject;
in response to manually controlling a focus of lens included in the camera, identifying, based on the depth information, a first area displaying a first graphic indicator for indicating a focusing area on which the camera is focused, in the image displayed on a display; and
displaying, on at least part of an outline of the at least one subject included in the first area, the first graphic indicator including a plurality of dots of a specific color,
wherein the first graphic indicator on the at least part of the outline of the at least one subject is displayed based on a detection of contrast of an edge of the at least one subject, and
wherein a display style of the first graphic indicator displayed on the at least part of the outline is based on the depth information.

12. The method of claim 11, wherein the displaying of the first graphic indicator comprises:
displaying the first graphic indicator using a first attribute, on at least some of the at least one subject included in the first area; and
displaying a graphic indicator using an attribute different from the first attribute, on at least some of another area different from the first area of the image.

13. The method of claim 12, further comprising:
determining, based on the depth information, a second area farther from the electronic device than the first area and a third area closer to the electronic device than the first area, among the other area; and displaying a second graphic indicator using a second attribute on at least some of the second area and displaying a third graphic indicator using a third attribute on at least some of the third area.

14. The method of claim 13, further comprising:
displaying a graphic interface for receiving an input signal which controls the focus of the camera on the display; and
displaying a first portion corresponding to the first area using the first attribute, displaying a second portion corresponding to the second area using the second attribute, and displaying a third portion corresponding to the third area using the third attribute, in the graphic interface.

15. The method of claim 14, wherein the displaying of the graphic interface comprises:
determining the depth of the focusing area, and
displaying an attribute corresponding to the depth on the graphic interface.

16. The method of claim 11, wherein the identifying of the first area comprises determining, based on the depth information and contrast information of the image, the first area.

17. The method of claim 16, further comprising:
controlling, based on the depth information, a reference value for display of the first graphic indicator.

18. The method of claim 17, wherein the controlling of the reference value comprises reducing the reference value for the display of the first graphic indicator, in a case in which the at least one subject included in the first area is positioned closer to the electronic device than a predetermined reference distance.

19. The method of claim 16, further comprising:
controlling, based on a zoom ratio of the image and the depth information, the reference value for the display of the first graphic indicator.

20. An electronic device comprising:
a camera;
a display;
a memory; and
at least one processor configured to:
obtain, based on information on pixels included in an image including at least one subject obtained using the camera, depth information corresponding to the at least one subject,
in response to manually controlling a focus of lens included in the camera, identify a focusing area on which the camera is focused according to an input signal, in the image displayed on the display, and
display, based on the depth information, a first graphic indicator on at least part of an outline of the at least one subject included in the focusing area,
wherein the first graphic indicator includes a plurality of dots of a specific color,
wherein the first graphic indicator on the at least part of the outline of the at least one subject is displayed based on a detection of contrast of an edge of the at least one subject, and
wherein a display style of the first graphic indicator displayed on the at least part of the outline is based on the depth information.

\* \* \* \* \*